(12) United States Patent
Nakano et al.

(10) Patent No.: US 7,483,548 B2
(45) Date of Patent: Jan. 27, 2009

(54) METHOD FOR DETECTING OBJECT FORMED OF REGIONS FROM IMAGE

(75) Inventors: Yuusuke Nakano, Akashi (JP); Youichi Kawakami, Tondabayashi (JP); Daisaku Horie, Uji (JP); Yuichi Kawakami, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 681 days.

(21) Appl. No.: 10/452,426

(22) Filed: Jun. 2, 2003

(65) Prior Publication Data
US 2004/0091153 A1 May 13, 2004

(30) Foreign Application Priority Data
Nov. 8, 2002 (JP) ............................ 2002-325511
Feb. 7, 2003 (JP) ............................ 2003-031060

(51) Int. Cl.
*G06K 9/00* (2006.01)
*G06K 9/68* (2006.01)

(52) U.S. Cl. ..................................... 382/103; 382/218
(58) Field of Classification Search ...................... None
See application file for complete search history.

(56) References Cited

U.S. PATENT DOCUMENTS 6,151,424 A * 11/2000 Hsu ........................... 382/294

6,545,706 B1 * 4/2003 Edwards et al. ............. 348/169

FOREIGN PATENT DOCUMENTS

| JP | 06-020049 (A) | 1/1994 |
| JP | 07-073317 (A) | 3/1995 |
| JP | 07-311833 (A) | 11/1995 |
| JP | 08-127476 (A) | 5/1996 |
| JP | 2000-331252 (A) | 11/2000 |

OTHER PUBLICATIONS

Yoshito Ohta et al., "Keyframe Tracking of Human Body in 3D Motion from a Monocular Image Sequence", *a technical report of The Institute of Electronics, Information and Communication Engineers*, vol. J81-D-II, No. 9, 1998, pp. 2008-2018.
Yoshito Ohta et al., "Keyframe Tracking of Human Body in 3D Motion from a Monocular Image Sequence", *The Technical Institute of Electronics, Information and Communication Engineers*, vol. J81-D-II, No. 9, 1998, pp. 2008-2018.
Notice of Grounds of Rejection dated Dec. 20, 2005, for counterpart Japanese Patent Application No. 2003-031060, with an English-translation thereof.

* cited by examiner

*Primary Examiner*—Bhavesh M Mehta
*Assistant Examiner*—Charles Kim
(74) *Attorney, Agent, or Firm*—Sidley Austin LLP

(57) ABSTRACT

An apparatus for detecting a person or the like from an image extracts candidates, which are considered to human body regions, from the image. Region likelihood probabilities of the respective candidates are obtained, and a human body likelihood of a collection of the candidates is probabilistically calculated using the region likelihood probabilities and correlations among the candidates. It is thereby possible to detect the person robustly against occlusion or change in photographic environment without increasing calculation cost.

19 Claims, 17 Drawing Sheets

ORIGINAL IMAGE

EDGE IMAGE

FEATURE AMOUNT EXTRACTION
(ELLIPSES AND PARALLEL SEGMENTS)

EXTRACTION OF PARAMETERS

ELLIPSE →
SHORT AXIS DIAMETER

EXTRACTION OF PARAMETERS

PARALLEL SEGMENTS→
WIDTH BETWEEN SEGMENTS

1. HEAD (PART ABOVE NECK)
2. LEFT UPPER ARM (FROM SHOULDER TO ELBOW)
3. LEFT LOWER ARM (FROM ELBOW TO WRIST)
4. RIGHT UPPER ARM
5. RIGHT LOWER ARM
6. TRUNK OF BODY
   (PART BELOW NECK TO JOINT OF LEG)
7. LEFT UPPER LEG (FROM JOINT OF LEG TO KNEE)
8. LEFT LOWER LEG (FROM KNEE TO ANKLE)
9. RIGHT UPPER LEG
10. RIGHT LOWER LEG (a) IF A PAIR IS FORMED (b) IF A PAIR IS NOT FORMED

METHOD FOR DETECTING OBJECT FORMED OF REGIONS FROM IMAGE

This application is based on Japanese Patent Applications Nos. 2002-325511 and 2003-31060 filed with Japan Patent Office on Nov. 8, 2002 and on Feb. 7, 2003, respectively, the entire content of which is hereby incorporated by reference.

BACKGROUND OF THE INVENTION

1. Field of the Invention

The present invention relates to a detection method and, more particularly, to a detection method for detecting a detection target formed of a plurality of regions from an image.

2. Description of the Related Art

In the field of monitoring cameras or the like, there are known methods for detecting a human body from a photographed image. As conventional human body detection methods, there are known "an intruder identification system" described in Reference 1: Japanese Laid-Open Patent Publication No. 6-20049 and "a composite type monitoring device" described in Reference 2: Japanese Laid-Open Patent Publication No. 2000-331252.

These are methods for detecting a moving object by using frame difference or the like to a picture or detecting a person by using a different sensor such as an infrared camera or the like.

On the other hand, in relation to methods in the field of human engineering such as man-machine interfaces and the like and the field of computer graphics or CG such as VR (virtual reality), animation and the like, a study of reproducing the attitude and operation of a person using a strict human body model has been performed.

For example, according to Reference 5: "Keyframe Tracking of Human Body in 3D Motion from a Monocular Image Sequence", a technical report of The Institute of Electronics, Information and Communication Engineers Vol. J81-D-II, No. 9, 1998, pp. 2008-2018, a method for applying a three-dimensional human body model to a person in an image is used. Reference 5 proposes setting a key frame to prevent an increase in application error and constraining the position and attitude of the model.

Further, in the authentication field, a method for specifying a facial region using standard positional relationship among such regions as an eye (eyes) and a mouth in face authentication is described in Reference 3: Japanese Laid-Open Patent Publication No. 7-311833 entitled "Human Face Detecting Device".

Moreover, a technique for specifying a head region using the standard positional relationship among regions to detect a head and obtaining the number of passengers waiting for an elevator is described in Reference 4: Japanese Laid-Open Patent Publication No. 8-127476. In Reference 4, the certainty factors of a hair region and a face region and the height relationship among regions are used to calculate the certainty factor of the head.

However, the methods described in both References 1 and 2 have a disadvantage of being incapable of performing high-level processing such as the measurement of number of persons, the estimation of the attitude of a person and the recognition of operation.

The method described in Reference 5 has a disadvantage in that collation using the key frame such as the setting of an initial value should be performed manually. The method described in Reference 5 has also a disadvantage of heavy calculation load since many attitude parameters are set for the three-dimensional model.

The technique of Reference 3 has a disadvantage of being incapable of detecting the face region if an eye or eyes cannot be detected because illumination conditions change or a target person wears sunglasses or the like (partial regions disappear due to occlusion).

The technique of Reference 4 is limited to the detection of the head and is disadvantageously incapable of being applied to a human body the attitude of which freely changes.

SUMMARY OF THE INVENTION

The present invention has been made to solve the conventional disadvantages described above. It is therefore an object of the present invention to provide a detection method and a detection program capable of detecting a detection target robustly against occlusion and change in photographic environment without increasing calculation cost.

In order to attain this object, according to one aspect of the present invention, a detection method for detecting a detection target formed of a plurality of regions, from an image, includes: an extraction step of extracting region candidates which become candidates of the plurality of regions, respectively, from the image; a probability calculation step of calculating a probability that each of the extracted region candidates is at least one of the regions; and a selection step of selecting a combination of the region candidates having a high probability as being the detection target based on the probability calculated in the probability calculation step.

According to another aspect of the present invention, a detection method for detecting a detection target formed of a plurality of regions, from a plurality of images photographed at different time, includes: an extraction step of extracting region candidates which become candidates of the plurality of regions from each of the plurality of images; a selection step of selecting a combination of the region candidates having a high probability as being the detection target; and a storage step of storing information on at least one of the plurality of images and on selection in the selection step, wherein in the extraction step, the region candidates are extracted while referring to a selection result stored in the storage step in relation to the images other than the at least one image among the plurality of images.

According to still another aspect of the present invention, a method for detecting a human body and estimating an attitude, includes: a step of inputting an image; a region feature extraction step of extracting features and obtaining region candidates; a region probability calculation step of calculating a region probability of each of the region candidates; and a person probability calculation step of selecting a combination of regions based on the region probability and a relationship among the regions.

According to yet another aspect of the present invention, a method for detecting a human body and estimating an attitude, includes: a step of inputting a moving image; a step of storing time-series region information; a region feature extraction step of extracting features and obtaining region candidates; a region probability calculation step of calculating a region probability of each of the region candidates; and a person probability calculation step of selecting a combination of regions based on the time-series region information, the region probability and a relationship among the regions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A detection apparatus and a detection method in the embodiments of the present invention will be described hereinafter. The apparatus and method in the embodiments of the present invention are intended to detect a human body and estimate an attitude robustly against occlusion or change in photographic environment without increasing calculation cost by probabilistically calculating a person likelihood using the region likelihoods of human body region candidates easily extracted from an image and the correlation among the regions.

First Embodiment

Figure 1:
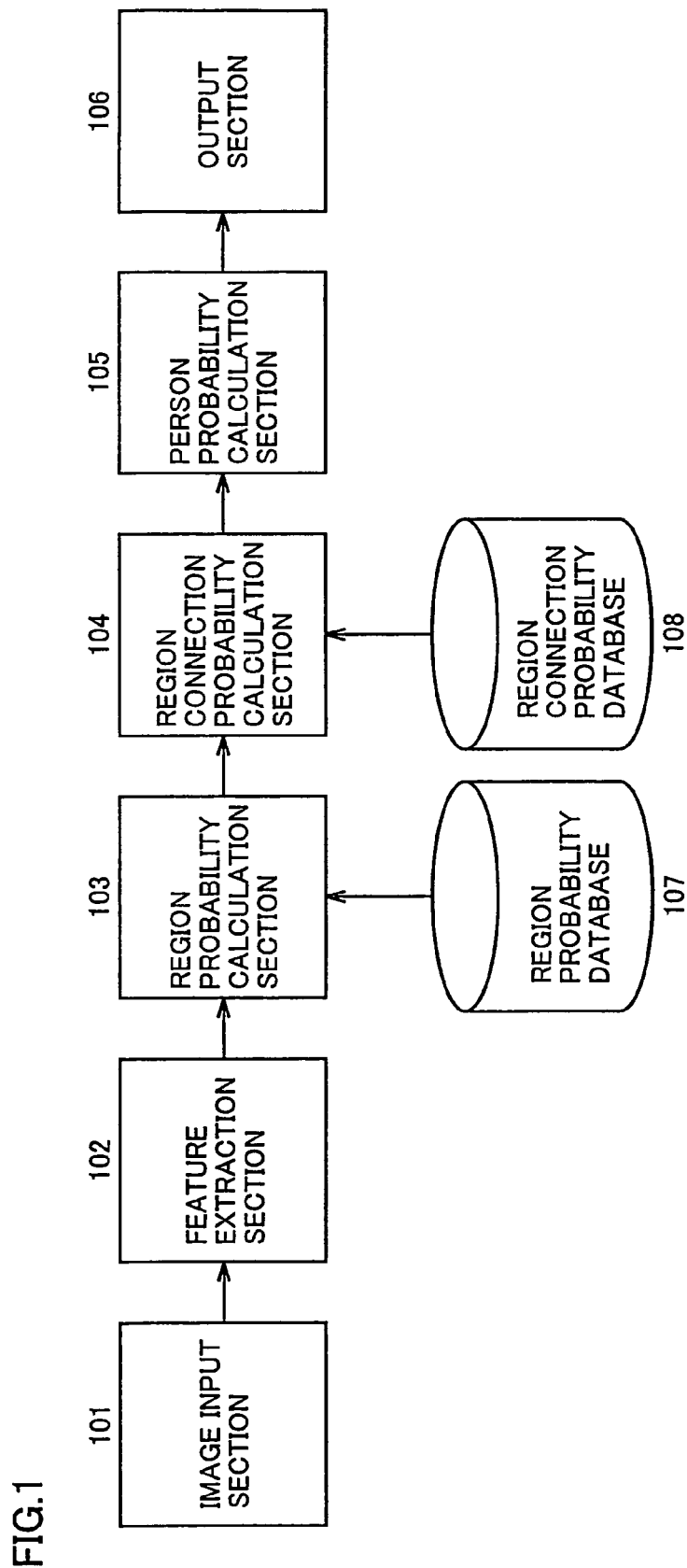
FIG. 1 is a block diagram showing the configuration of an object attitude estimation apparatus in the first embodiment according to the present invention.

Referring to FIG. 1, an object attitude estimation apparatus includes an image input section 101, a feature extraction section 102, a region probability calculation section 103, a region probability database 107, a region connection probability calculation section 104, a region connection probability database 108, a person probability calculation section 105 and an output section 106.

Image input section 101 is a member that inputs an image. Image input section 101 may directly input an image from a digital camera, a scanner or a digital video camera or may input an image or a moving image stored in a storage medium.

Feature extraction section 102 detects the features of an object from the input image.

Figure 2:
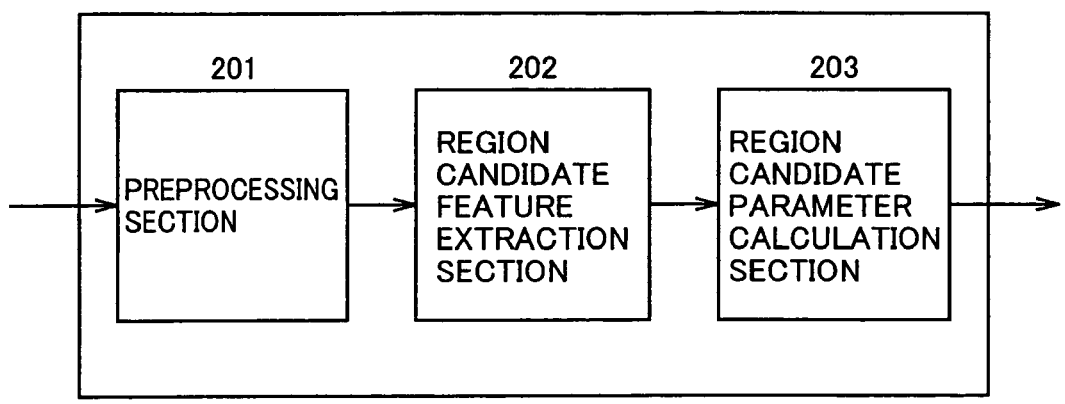
FIG. 2 is a block diagram showing the basic configuration of a feature extraction section 102.

FIG. 2 is a block diagram showing the basic configuration of feature extraction section 102.

Referring to FIG. 2, feature extraction section 102 includes a preprocessing section 201, a region candidate feature extraction section 202 and a region candidate parameter calculation section 203.

Preprocessing section 201 extracts edges and colors of the input image so as to extract image features from the image. In addition, preprocessing section 201 generates a plurality of sizes of images (multiple resolution images) from one image so as to correspond to changes in the size of the person.

Region candidate extraction section 202 extracts region candidates such as shapes including an ellipse, a line, a curve and parallel segments and color regions of specific sizes for the image converted by preprocessing section 201.

Region candidate parameter calculation section 203 calculates parameters for the respective region candidates selected by region candidate extraction section 202.

Referring back to FIG. 1, region probability calculation section 103 calculates the region probabilities of the respective region candidates for the respective regions. A probability density function (or likelihood function) for calculating each region probability is stored in region probability database 107.

Region connection probability calculation section 104 obtains a connection likelihood for a combination of parameters for one region candidate and those for the other region candidate. A probability density function likelihood function) for calculating the region connection probability is stored in region connection probability database 108.

Person probability calculation section 105 calculates a combination of region candidates optimum for a person using the region probabilities attached to the respective region candidates and the region connection probabilities calculated based on the relationships among the regions.

Output section 106 displays the results of the number of humans and the attitudes of the regions on a monitor or the like. Referring to the drawings, a processing for detecting a person from an actual image will first be described.

Figure 3:
FIG. 3 shows a concrete example of an image input to an image input section 101 shown in FIG. 1.

FIG. 3 shows a concrete example of the image input to image input section 101 shown in FIG. 1. Referring to FIG. 3, it is assumed that this image includes two sitting persons.

Figure 4:
FIG. 4 shows the result of processing the image shown in FIG. 3 by a preprocessing section 201 shown in FIG. 2.

FIG. 4 shows the result of processing the image shown in FIG. 3 by preprocessing section 201 shown in FIG. 2. Preprocessing section 201 extracts edges and colors of the input image so as to extract image features from the input image. As a result, an edge image shown in FIG. 4 is obtained.

Figure 5:
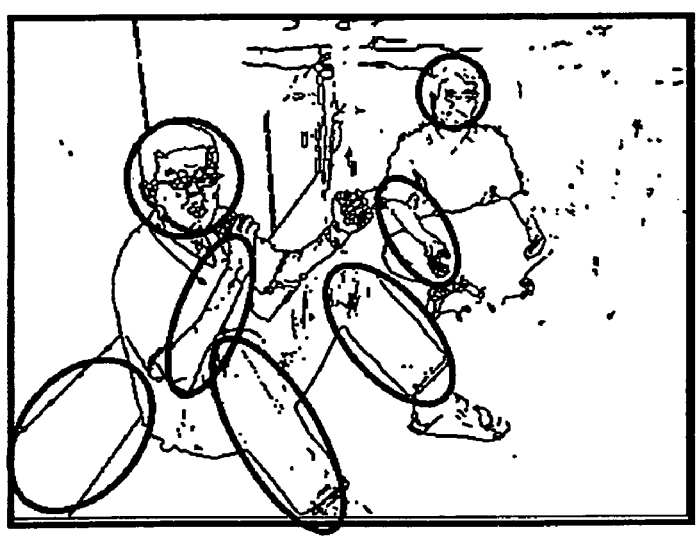
FIG. 5 shows the result of processing the image shown in FIG. 4 by a candidate region extraction section 202 shown in FIG. 2.

FIG. 5 typically shows the result of processing the image shown in FIG. 4 by region candidate extraction section 202 shown in FIG. 2.

Region candidate extraction section 202 extracts region candidates which are considered to constitute each person such as shapes of ellipses, curves and parallel segments and color regions of specific sizes from the image converted by preprocessing section 201. It is assumed herein that region candidate extraction section 202 extracts ellipses considered to correspond to the heads of the persons and parallel segments considered to correspond to the arms, bodies and legs of the persons from the edge image. The parts surrounded by circles and ellipses in FIG. 5 indicate the extracted ellipses and parallel segments, respectively.

Thereafter, region candidate parameter calculation section 203 calculates (measures) parameters for the respective region candidates selected by region candidate extraction section 202.

Figure 6:
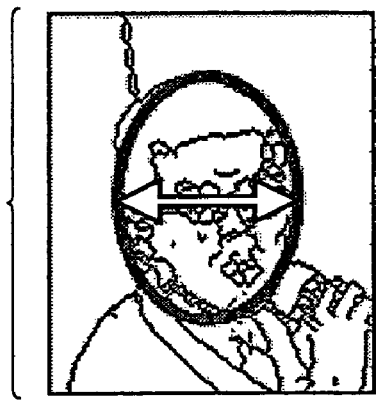
FIG. 6 shows an example of calculating parameters for an ellipse.
Figure 7:
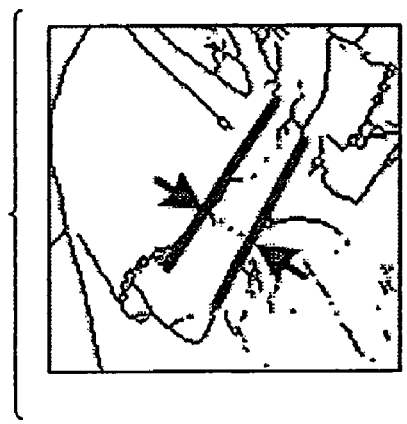
FIG. 7 shows an example of calculating parameters for parallel segments.

It is assumed herein that the diameter of the short axis, coordinates and the like of each ellipse are measured as shown in FIG. 6. It is also assumed herein that the width (distance) between the segments, the coordinates and the like are measured for each parallel segment as shown in FIG. 7.

Figure 8:
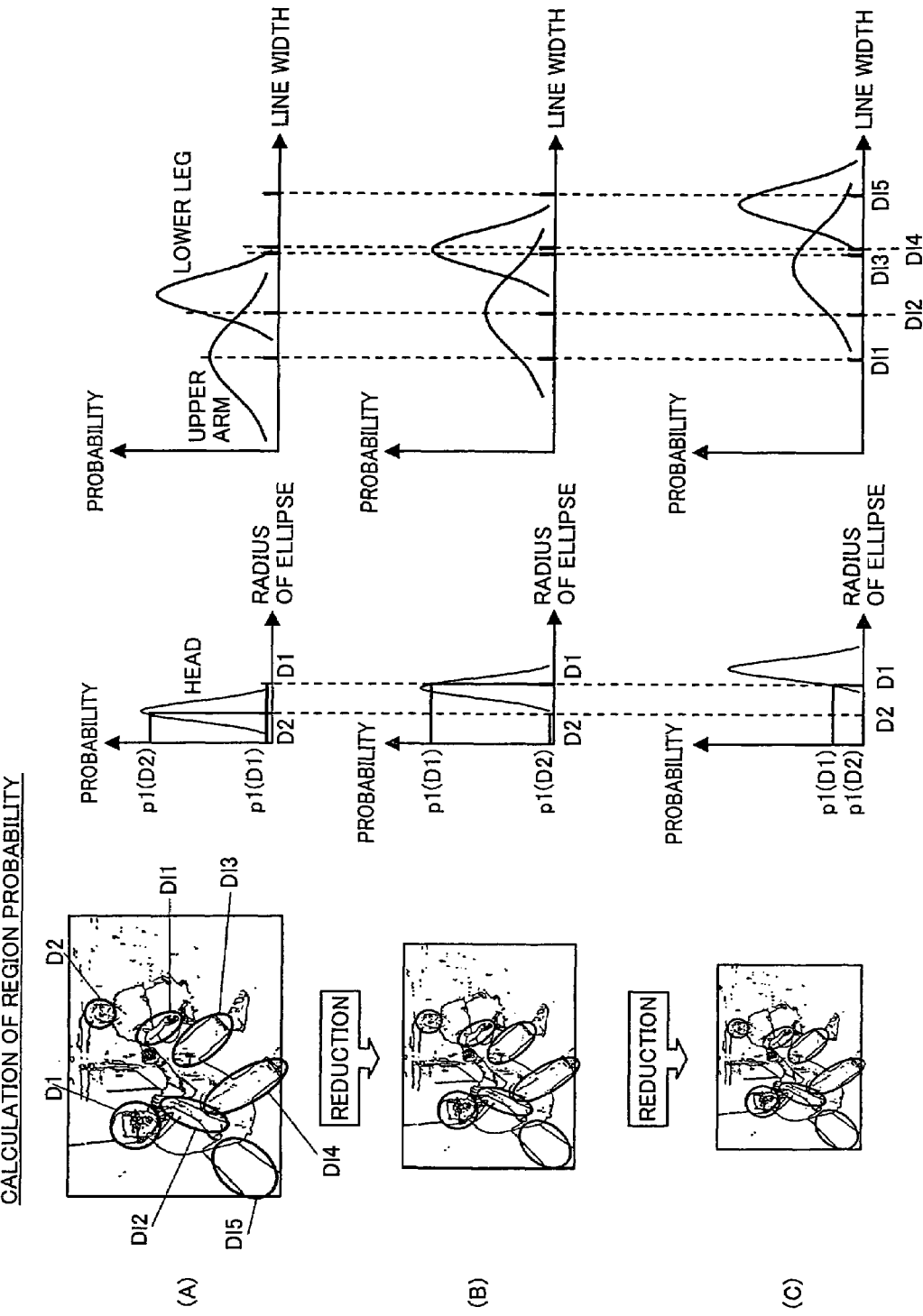
FIG. 8 describes a processing performed by a region probability calculation section 103.

FIG. 8 describes a processing performed by region probability calculation section 103.

Referring to FIG. 8, region probability calculation section 103 calculates region probabilities of region candidates D1, D2, and D11 to D15, respectively (e.g., if the region candidate is parallel segments, the probability that the parallel segments are an upper arm or a lower leg is calculated). As a result, the probability that each of the region candidates corresponds to which region constituting each person can be obtained.

To calculate the region probabilities, probability density functions (or likelihood functions) stored in region probability database 107 are used. Each of the probability density functions (or likelihood functions) is expressed as a function having a peak in graphs of FIG. 8 and individual functions are employed for the head, the upper arm and the lower leg.

In FIG. 8, region candidates D1 and D2 are ellipses and compared with the probability density function p1(x) of the head. It is assumed herein that the probability density function of the head is a function which shows the probability that an ellipse is the head of a person, relative to the radius of the ellipse. This applies to respective multiple resolution images (A) to (C) generated so as to correspond to changes in the size of the persons, and the head likelihoods (region probabilities) of the ellipses with the respective resolutions p1(D1) and p1(D2) are obtained.

Region candidates D11 to D15 are parallel segments and compared with the probability density functions of the upper arm and the lower leg. As a result, it is possible to numerically express to what degree each region candidate is akin to which region of the human body.

Region connection probability calculation section 104 calculates a combination of which region candidates are considered to constitute one human body based on the positional relationships among region candidates D1, D2 and D11 to D15 and according to the contents of region connection probability database 108.

Finally, person probability calculation section 105 determines the number of persons in the image and the attitudes of the persons based on the calculation result of region probability calculation section 103 and that of region connection probability calculation section 104, and outputs them from output section 106.

An overall processing flow will next be described with reference to a sequence flow shown in FIG. 9.

Figure 10:
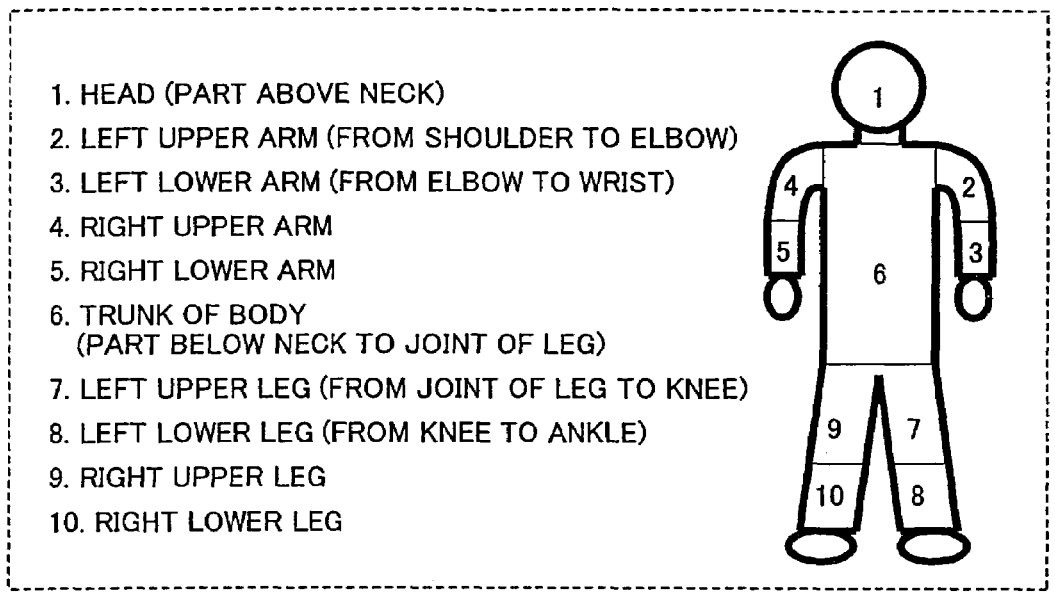
FIG. 10 shows a human body construction model.

For the brevity of description, it is assumed herein that a human body is formed of a head, an upper arm, a lower arm, the trunk of a body, an upper leg and a lower leg as shown in FIG. 10. Alternatively, the other various regions such as a shoulder, a neck, a waist, hands, feet and the like besides the head, the upper arm, the lower arm, the trunk, the upper leg and the lower leg may be set as detection targets.

Elements (region candidates) detected from the image may include ellipses (heads), parallel lines (arms, trunks, legs and necks), segments (shoulders, necks, arms, trunks and legs), curves (shoulders, trunks and waists), skin color regions (faces, hands, legs), black regions (hairs) and the like.

Parameters obtained from these elements (region candidates) include sizes, positions, attitudes, lengths, widths, radii of curvature, kurtosis, frequency characteristics and the like.

It is assumed herein that the region candidate for the head has a feature of an ellipse and the other region candidates have a feature of parallel segments. The parameters for the ellipse are assumed as the x and y coordinates of the center and the length of a short axis (the length of a long axis is a constant multiple of the short axis, e.g., 1.2 times as large as the short axis). Further, the parameters for the parallel segments are assumed as the x and y coordinates of the center of gravity, the distance between the two lines and an angle. It is further assumed that region probability database stores region likelihood functions.

Figure 9:
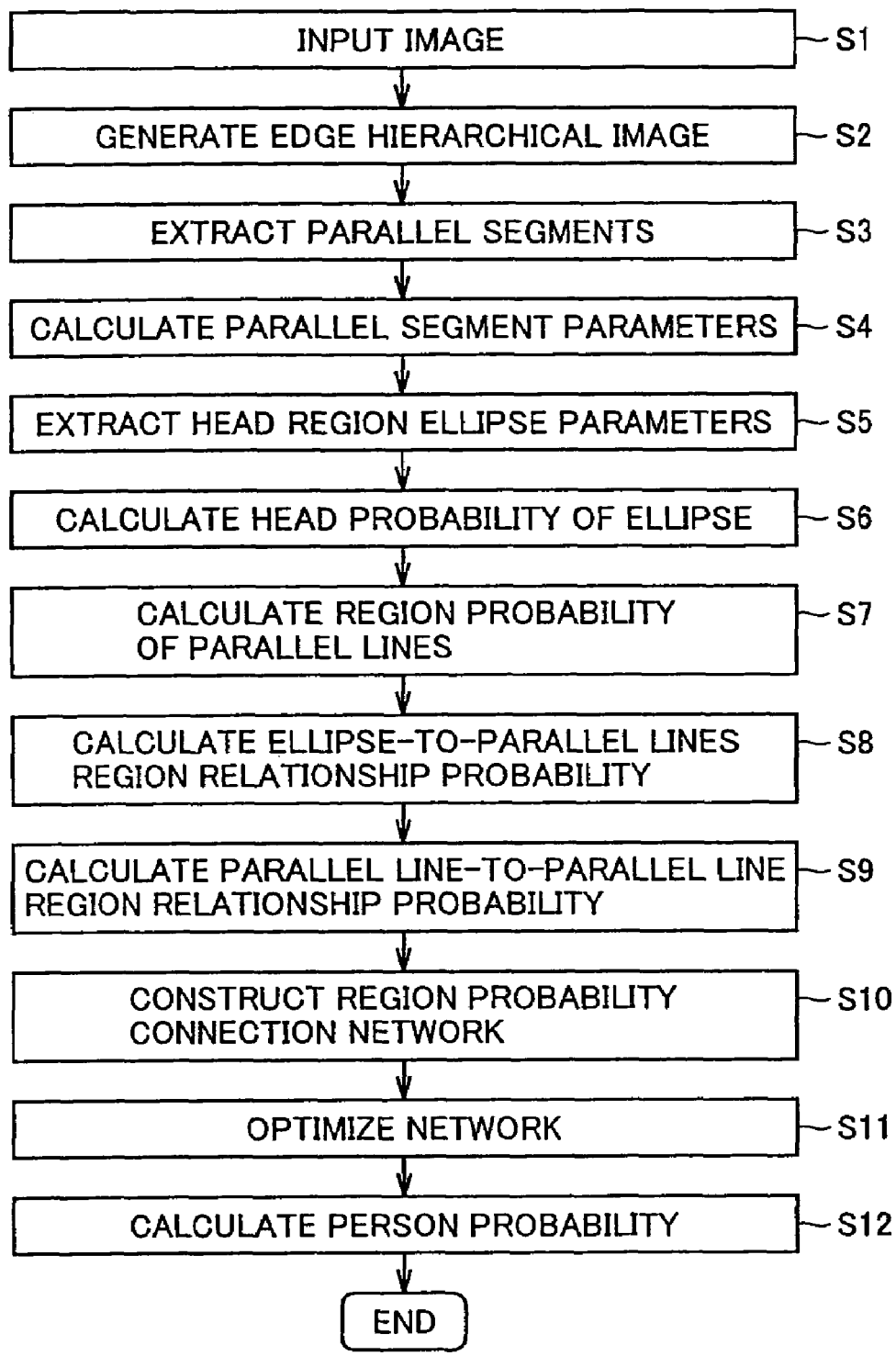
FIG. 9 is a flow chart showing the overall processing flow of the apparatus shown in FIG. 1.

Referring to FIG. 9, an image from which a person or persons are to be detected is input from image input section 101 (in a step s1).

Preprocessing section 201 of feature extraction section 102 then extracts edges from the image using a differential filter. As the differential filter, a sobel filter may be used. According to multiple resolution strategy, the multiple resolution images of an edge image are prepared (in a step s2).

Lines in certain directions are detected from the edge image and subjected to thinning and labeling. A pair of parallel lines are discovered from the obtained lines and set as header region candidates (in a step s3).

Figure 11:
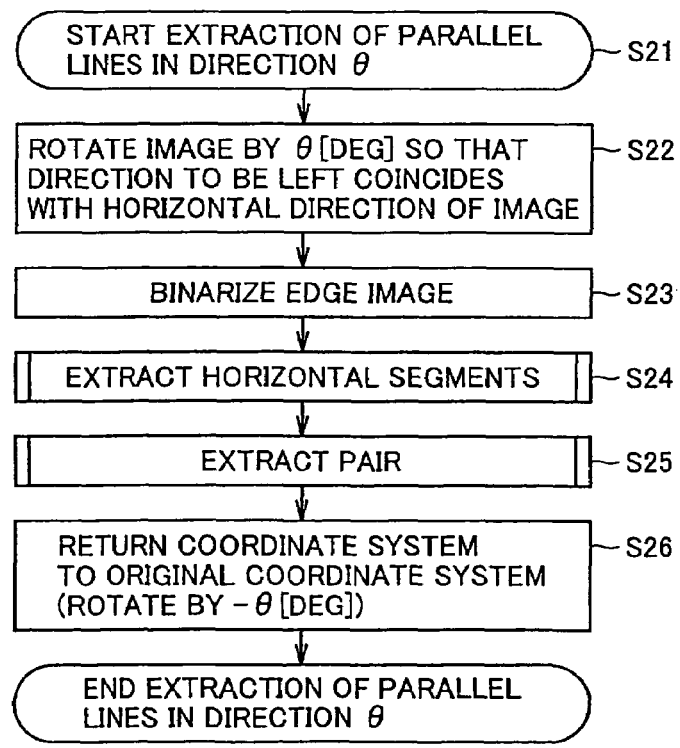
FIG. 11 is a flow chart showing the detail of a step s3 shown in FIG. 9.

Step s3 will be described with reference to the flow chart of FIG. 11.

In this embodiment, a method for repeatedly performing a processing for changing the direction of the image is adopted in order to extract parallel lines in a certain direction.

Directions are, for example, four directions at 0[deg], 30[deg], 60[deg] and 90[deg], three directions at 0[deg], 45[deg] and 90[deg], or may be four or more directions.

The processing for extracting parallel segments in the certain direction (at an angle assumed as θ) (step S21) will be described. This is a processing for extracting only the segments having this directionality and selecting the segments which form a pair of parallel lines from the extracted segments.

Actually, the image is first rotated so that a direction to be left coincides with a horizontal direction so as to facilitate the processing (in step S22). Thereafter, the edge image is binarized (in step S23), segments in a horizontal direction to the binary image are extracted (in step S24), segments which form a pair are extracted (in step S25), and the image is finally rotated by −θ[deg] to thereby return the coordinate system of the image to the original coordinate system (in step S26).

Figure 12:
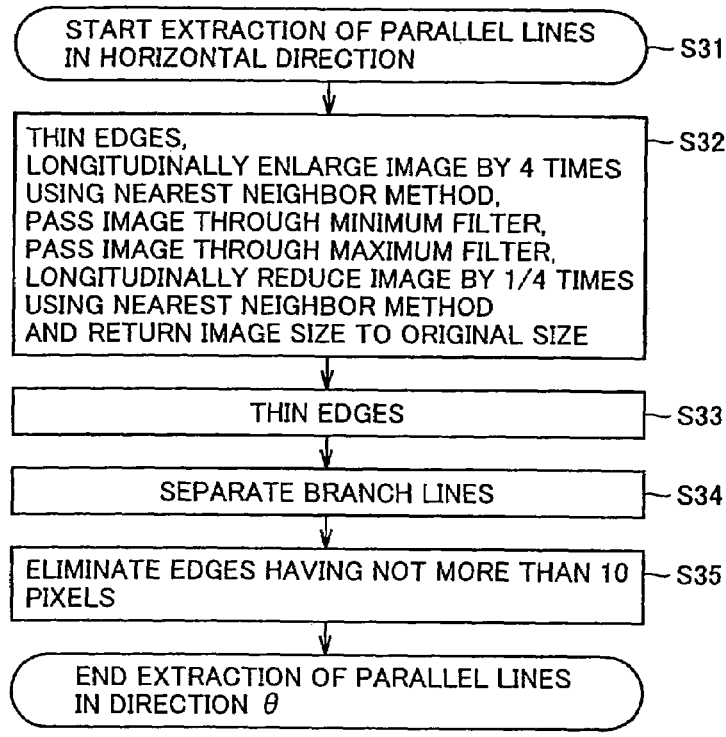
FIG. 12 is a flow chart showing a method for extracting a horizontal segment.

Next, the extraction of the segments in the horizontal direction (step S31) will be described with reference to the flow chart of FIG. 12. It is assumed herein that the horizontal segments are extracted by performing unidirectional morphology processing.

First, the edges are thinned. The image is then enlarged by four times in a longitudinal direction using a nearest neighbor method, and the resultant image is passed through a minimum filter and a maximum filter. Using the nearest neighbor method again, the resultant image is reduced by ¼ times in the longitudinal direction to return the size of the image to an original image size (in step S32). The edge image thus obtained is thinned again (in step S33).

If there are branch lines, the number of intersections of pixels is calculated to eliminate the branch lines. If the number of intersections is 3 or 4, the pixels are transformed from the edge pixels (in step S34). Through this processing, branch points can be eliminated.

Thereafter, edges having not more than 10 pixels are eliminated (in step S35). Thus, only the horizontal segments are extracted.

Figure 13:
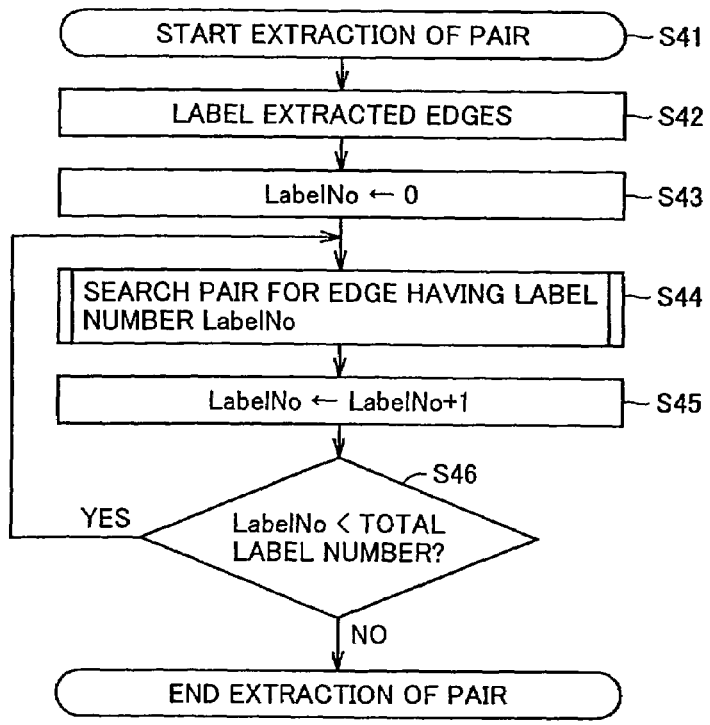
FIG. 13 is a flow chart showing a method for extracting a pair of segments.

The extraction of a pair (step S41) will be described with reference to FIG. 13.

First, the obtained edges are subjected to labeling (the edged are respectively labeled label numbers 1, 2, ... and LabelMax) (in step S42). Segments which form a pair are searched in relation to the labels in the ascending order of label numbers (in step S44) (which step will be described later in detail). The processing is repeated up to the label number LabelMax (in steps S43 to S46).

Figure 14:
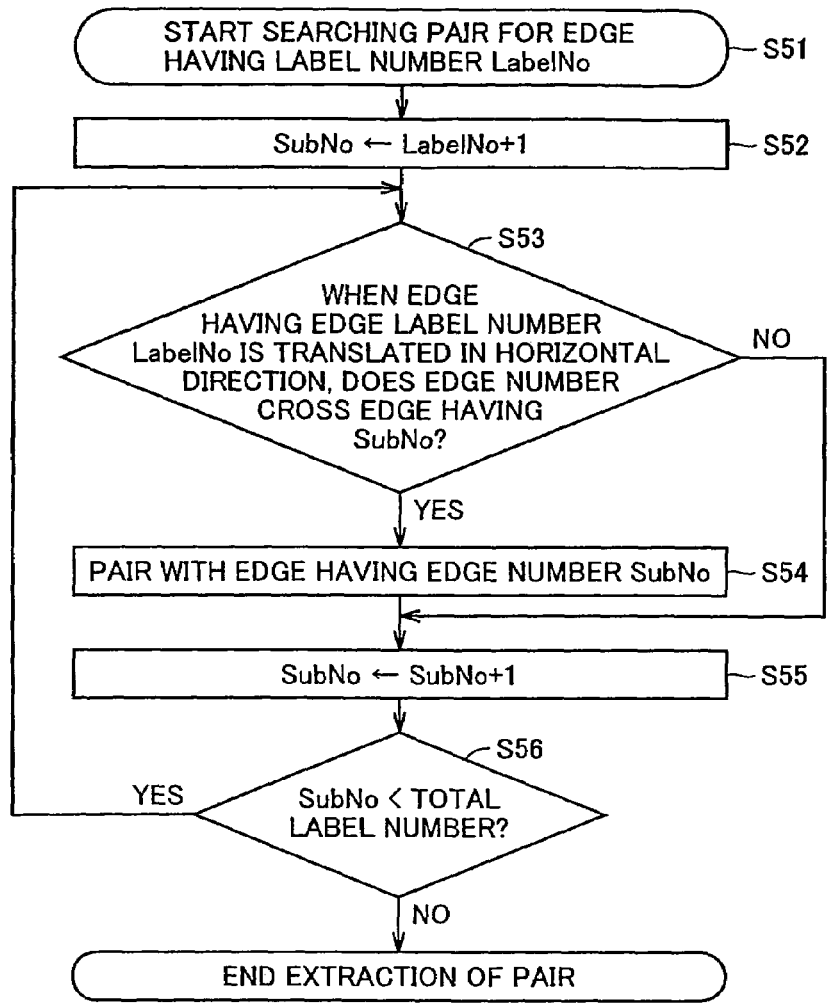
FIG. 14 is a flow chart showing a processing for searching a pair in relation to certain labels.

A processing for searching a pair related to an edge of a certain label (with a label number assumed as LabelNo) will be described with reference to FIG. 14 (in step S51).

If a segment a pairs with a segment b, segment b always pairs with segment a. Accordingly, it suffices to search, for example, segments with (LabelNo)+1 to LabelMax so as to determine whether two segments pair with each other (in steps S52 to S56).

Whether edge [LabelNo] pairs with edge [SubNo] (SubNo=[(LabelNo)+1, ... , LabelMax]) is determined as follows (in step S53).

Figure 15:
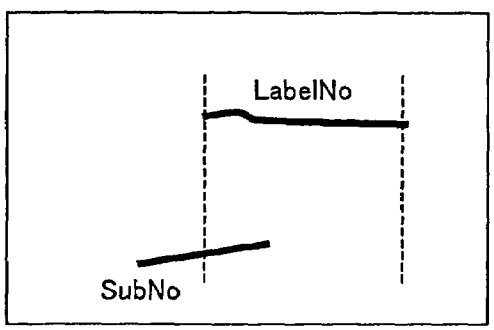
FIG. 15 shows edges which pair with each other.

Referring to FIG. 15, vertical lines which respectively pass the upper end point and the lower end point of edge [LabelNo] are drawn. If even a part of edge[SubNo] is included in a range defined by the vertical lines, it is determined that edge [LabelNo] pairs with edge [SubNo].

Figure 16:
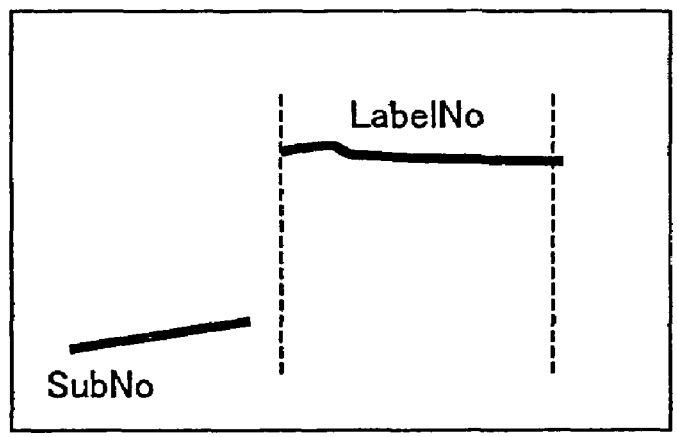
FIG. 16 shows edges which do not pair with each other.

On the other hand, as shown in FIG. 16, vertical lines which respectively pass the upper end point and the lower end point of edge [LabelNo] are drawn. If even a part of edge [SubNo] is not included in a range defined by the vertical lines, it is determined that edge [LabelNo] does not pair with edge [SubNo].

Referring back to FIG. 9, parameters for the obtained parallel segments are calculated (in step s4). The parameters are used to extract a region probability later.

It is assumed that the parameters are three parameters of (1) width d of the parallel line pair, (2) direction θ of the parallel line pair, and (3) position m of the parallel line pair.

For describing the parameters, the directions and positions of the line edges will be described.

Figure 17:
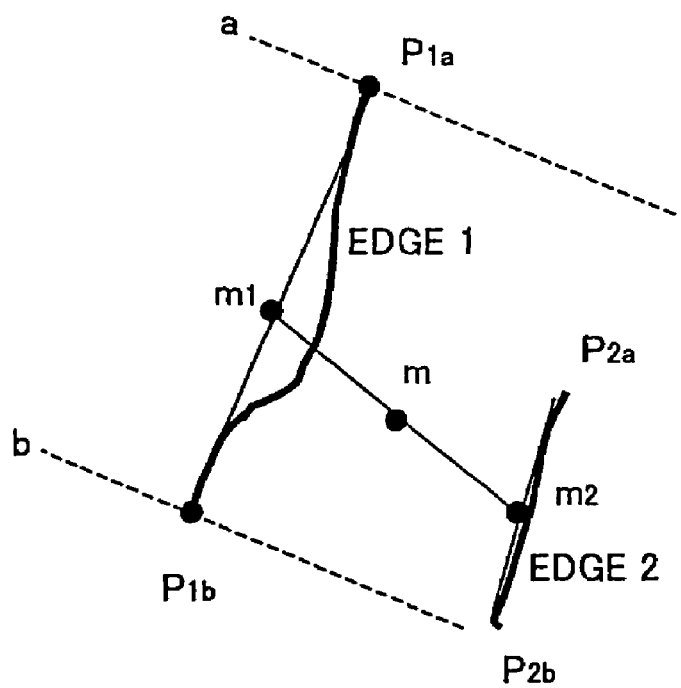
FIG. 17 describes a method for obtaining parameters for a pair of parallel lines.

Referring to FIG. 17, it is assumed as follows. The end points of an edge 1 are $P_{1a}$ and $P_{1b}$. The position of edge 1 is the midpoint of $P_{1a}$ and $P_{1b}$. The direction of $P_{1a}$ and $P_{1b}$ is the direction of edge 1. However, if the method for extracting only edges in a certain direction is adopted as described in relation to the extraction of parallel lines, the edge direction may be set at the certain direction.

It is assumed that edge 1 pairs with an edge 2 and that the positions of edges 1 and 2 are $m_1$ and $m_2$, respectively. It is also assumed that the directions of edges 1 and 2 are $\theta_1$ and $\theta_2$, respectively. If so, it is assumed as follows:
(1) Width d of the parallel line pair is the difference between the positions of the line edges, i.e., $d=|m_1-m_2|$,
(2) Direction θ of the parallel line pair is the average of the directions of the respective line edges, i.e., $\theta=(\theta_1+\theta_2)/2$, and
(3) Position m of the parallel line pair is the midpoint of the positions of the respective line edges, i.e., $m=(m_1+m_2)/2$.

Referring back to the flow chart of FIG. 9, if the processings of steps s3 and s4 are performed to the original image, the features of the same parallel lines in respective hierarchies can be automatically calculated.

In addition, an elliptic shape is extracted from the edge image using Hough transform or the like and the extracted elliptic shape is set as a head candidate (in step s5). If the size of the ellipse detected in each hierarchy is fixed, it is possible to determine the sizes in all the corresponding hierarchies from the detection result. Processings in the following steps are performed to all the hierarchies.

It is noted that the processing of step s3 is performed by region candidate extraction section 202, that of step s4 is performed by region candidate parameter calculation section 203, that of step s5 is performed by region candidate extraction section 202 and region candidate parameter calculation section 203.

Next, region probability calculation section 103 obtains the region likelihoods of the respective region candidates for each region.

The head likelihood of the elliptic candidate is obtained using the short axis parameter (in step s6). The probability that the ellipse is the head is thereby calculated.

Further, the upper arm likelihood, lower arm likelihood, upper leg likelihood and lower leg likelihood of the parallel line candidates are obtained in relation to the thickness parameter (width d of the parallel lines) (in step s7).

It is noted that the parameters for obtaining the region likelihoods are not limited to the size of the ellipse and the thickness (width) of the parallel lines (which will be described later in detail).

The likelihoods are calculated from the likelihood functions stored in region probability database. The likelihood functions can be statistically obtained from a plurality of person images. For example, the upper arm likelihood function can be obtained by calculating the thickness of the upper arm and normalizing a thickness-related histogram for a plurality of person images normalized according to a height, a head size or the like. Alternatively, the likelihood can be approximated to a Gauss distribution by calculating average and dispersion.

In other words, if a distance (width) parameter is d, an average is $m_d$ and a standard deviation is $\sigma_d$, an upper arm likelihood function p(d) can be approximated to the following formula (1).

The same thing is true for the other regions using the features of the parallel lines.

The head likelihood always becomes 1 if it is normalized by a detected head size. If the head likelihood is normalized by a height, a hierarchy with an average head size is calculated and the person likelihood is calculated in hierarchies before and after this hierarchy.

If a distance parameter for a region candidate $l_1$ which is one parallel line obtained at present is $d_1$, the upper arm likelihood can be obtained as $p(d_1)$. Since the other region likelihoods can be similarly calculated relative to $d_1$, a region likelihood vector as expressed by the following formula (2) is attached to one region candidate $l_1$.

$$p(d) = \frac{1}{\sqrt{2\pi}\,\sigma_d} e^{-\frac{(d-m_d)^2}{2\sigma_d^2}} \qquad (1)$$

-continued $$P = \begin{pmatrix} p_1(d_1) \\ p_2(d_1) \\ \vdots \\ p_D(d_1) \end{pmatrix} \qquad (2)$$

In the formulas (1) and (2), the subscript of p represents each region using the feature of the parallel line. D denotes the total number of the regions, e.g., 5.

Region likelihood vectors are calculated for all the region candidates thus obtained and stored as the description of the human body.

Next, while assuming that a parameter for one region candidate belongs to a certain region, region connection probability calculation section 104 calculates a region relationship likelihood for an arbitrary combination of regions when a parameter for the other region candidate belongs to the other region.

First, an ellipse-to-parallel line region relationship likelihood is obtained for the elliptic candidate and a parallel line candidate (in step s8).

The region relationship likelihood will be described, while assuming, for example, that the combination of two regions is that of the head and the upper arm.

It is assumed that parameters for the ellipse are $D_1=(X_1, Y_1, r_1)$ and that those for the parallel lines are $l_1=(x_1, y_1, d_1, \theta_1)$.

$(X_1, Y_1)$ is the central coordinates of the ellipse, $r_1$ is the length of the short axis of the ellipse, $(x_1, y_1)$ is the central coordinates of the parallel lines and $d_1$ is the width of the parallel lines. Further, $\theta_1$ is the angle between the parallel lines and the x axis.

The likelihood based on the distance between the two regions is calculated using the following formula (3).

A likelihood function $L_1$ can be calculated as a statistical histogram in relation to the distance $l_{en}$ between the head position and the upper arm position normalized by the height or the like as in the case of the region probability. In addition, likelihood function $L_1$ can be approximated to the Gauss distribution or the like.

It is noted that a combination of likelihood function $L_1$ and a likelihood function $L_2$ (formula (4)) based on the size ratio of the two regions may be used. Likelihood function $L_2$ expressed by formula (4) can be similarly calculated as a statistical histogram in relation to p.

If it is assumed that the feature amounts of the distance between the regions and those of the size ratio are statistically independent of each other, the region relationship likelihood can be also calculated as expressed by the following formula (5).

$L_1=L_1(len)$ (where $len=len=\{(x_1-X_1)^2+(y_1Y_1)^2\}^{1/2}$: the distance between the parallel lines and the ellipse)(3)

$L_2=L_2(p)$ (where $p=d_1/r_1$) (4)

$L(D_1,l_1)=L_1(len)\cdot L_2(p)$ (5)

Likewise, the region relationship likelihood between the head and the other region using the parallel line features is calculated.

After calculating the ellipse-to-parallel line relationship likelihood in step s8, a parallel line-to-parallel line region relationship likelihood is obtained (in step s9).

The parallel line-to-parallel line region relationship likelihood will be described while assuming that the combination of two regions is that of the upper arm and the lower arm.

It is assumed that parameters for a parallel line 1 are $l_1=(x_1, y_1, d_1, \theta_1)$ and that those for a parallel line 2 are $l_2=(x_2, y_2, d_2, \theta_2)$.

A likelihood based on the distance between the two regions is calculated by the following formula (6).

A likelihood function $L_3$ can be similarly calculated as a statistical histogram. In addition, likelihood function $L_3$ can be approximated to the Gauss distribution.

A combination of likelihood function $L_3$ and a likelihood function $L_4$ based on the width difference between the two regions (formula (7)) may be used. If likelihood function $L_4$ is used, it is preferable not to use the absolute value of the width difference. If a distribution in which the probability of becoming negative is low is selected for $L_4$, it is possible to reflect an ordinary tendency that the upper arm is never thinner than the lower arm, on the likelihood function whether the target person wears a long-sleeved shirt or a half-length sleeved shirt. Alternatively, an appropriate distribution may be assumed from an obvious human body model.

Similarly to the ellipse-to-parallel line region relationship likelihood, likelihood function $L_4$ can be defined as a formula (8).

$L_3=L_3(len)$ (where $len=len\{(x_1-x_2)^2+(y_1-y_2)^2\}^{1/2}$: the distance between the parallel lines)(6)

$L_4=L_4(d)$ (where $d=d_1-d_2$) (7)

$L=L_3\cdot L_4$ (8)

While one-dimensional likelihood functions between the regions are defined each based on one variable, it is also possible to define the region relationship likelihood functions based on two or more variables.

For example, the likelihood can be calculated as two-dimensional parameters of (len, $\phi$) based on distance len between the parallel lines with an angle $\phi=|\theta_1-\theta_2|$ between the two parallel lines set as a variable. If considering that the likelihood function is statistically obtained, a distribution that reflects a tendency that angle $\phi$ does not become narrow when length len is large and angle $\phi$ does not become wide when length len is small should appear.

While the region relationship likelihood has been described while taking the upper and lower arms as an example, a region relationship likelihood is similarly calculated for a combination of the other regions using the parallel line features.

In the calculation of the region likelihoods and region relationship likelihoods, color information (hue, chroma, brightness, the fact that the color of the face skin and that of the hand skin of the same person can be regarded equal), texture information such as the pattern, wrinkles and the like of clothes, in-focus information, the strength of edges and the continuity thereof and the like can be used. Further, lines and curves of the shoulder, waist and the like as well as the upper and lower arms are slightly tapered. Using the radii of curvatures and angles of such lines and curves, the likelihoods can be obtained. The likelihoods can be further calculated from feature amounts obtained by analyzing the main components of the edge image for each region. If time-series information can be obtained, the likelihood functions can be generated from the moving rate, change direction, periodicity and the like of each region.

Person probability calculation section 105 constitutes a region probability connection network (to be referred to as "PPCN" hereinafter) in order to detect a human body as a collection of connected regions (in step s10).

Figure 18:
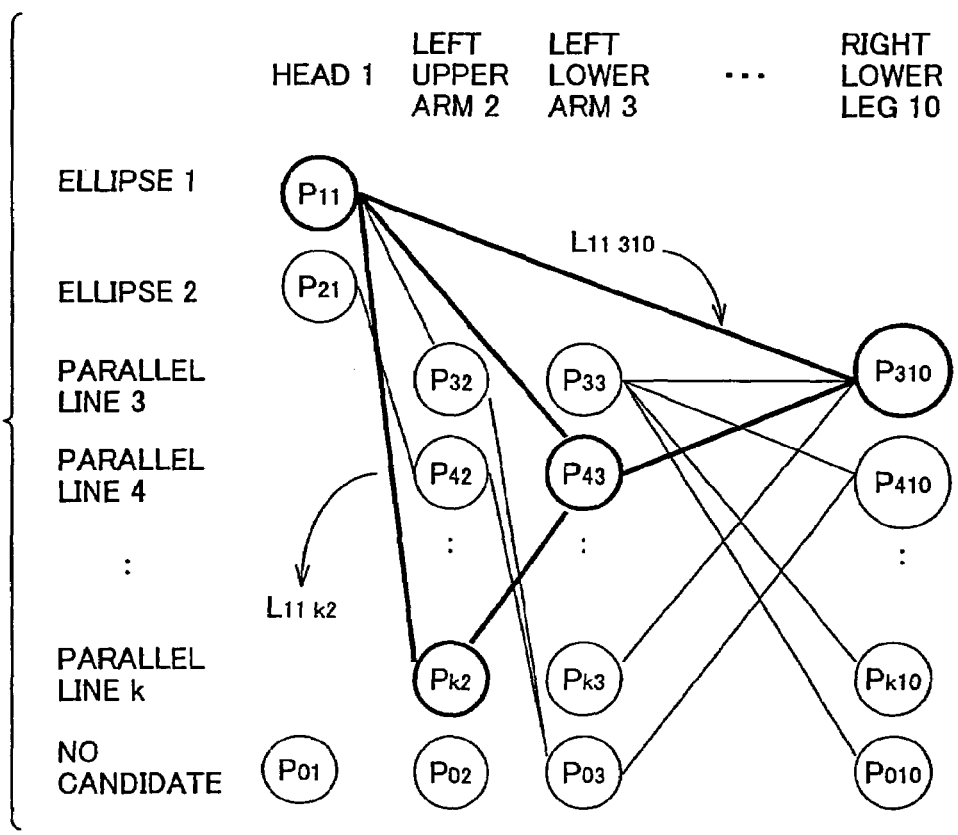
FIG. 18 shows a concrete example of the network configuration of a PPCN.

An example of the network configuration of PPCN is shown in FIG. 18.

One node is allocated to a combination of a region candidate on the vertical axis and a region on the horizontal axis. It is assumed herein that a total of ten regions (see FIG. 10) are allocated nodes so as to discriminate the left and right upper and lower arms and left and right upper and lower legs from one another. Further, nodes corresponding to 'no candidate' are provided in the lowest row and nodes corresponding to 'no region' are provided in the rightmost column. Weights are defined between arbitrary two nodes except for those in the rightmost column.

Each node is given a corresponding region candidate and a region likelihood for the region. On the other hand, the edge (arc) between the two nodes is given, as a weight, a region relationship likelihood if two corresponding region candidates are regarded as corresponding two regions.

The meaning of PPCN will be described. If one node is selected from each column except for the rightmost column, the respective region candidates that possibly constitute a human body are selected. From a set of the selected regions, the human body likelihood can be calculated as follows.

It is assumed, for example, that thick nodes are selected as shown in FIG. 18.

These nodes are given region likelihoods $P_{11}$, $P_{k3}$, $P_{43}$, ... and $P_{3,10}$, respectively. In addition, a region relationship likelihood weight $L_{ijkl}$ is given between two arbitrary nodes $P_{ij}$ and $P_{kl}$.

If assuming that these likelihoods are calculated from statistically independent feature amounts, the human body likelihood can be calculated as:

$$L = P_{11} \cdot P_{k2} \cdot P_{43} \cdot \ldots \cdot P_{310} \cdot L_{11k2} \cdot L_{1143} \cdot \ldots \cdot L_{11310} \cdot L_{k243} \cdot \ldots$$

Generally, if the $k(j)^{th}$ region likelihood selected from the $j^{th}$ region column is $P_{k(j)j}$, the human body likelihood is expressed as the following formula (9).

$$L = \prod_{j=1}^{10} P_{k(j)j} \prod_{t \neq s}^{10} L_{k(t)tk(s)s} \quad (9)$$

By considering now the region relationship likelihood between the two arbitrary nodes for the selected node column, it is possible to robustly calculate the human body likelihood based on the correlation with the other regions even if there is no candidate for a certain region (if the node in the lowest row is selected). When the node in the lowest column is selected, the region relation likelihoods can be fixed to the maximum likelihood by $\alpha$ times (constant number of $0<\alpha<1$). This mechanism is useful to robustly detect a human body even if image features can be unsatisfactorily extracted because of occlusion or photographic environment.

While PPCN has been described while referring to the case where the region likelihoods are allocated to the respective nodes and the region relationship likelihoods are allocated, as weights, to the respective edges. Alternatively, it is possible to consider a structure in which the product of the region likelihoods of two nodes and the region relationship likelihood therebetween is allocated, as the region connection likelihood, to each edge.

In the latter case, it is sometimes possible to dispense with the calculation of the region likelihoods. For example, as the region connection likelihood for parallel line $l_1$ which is the upper arm and parallel line $l_2$ which is the lower arm, the product of the likelihood functions for two parameters of $(d_1, d_2)$ and $L_3 = L_3(\text{len})$ can be used.

After these processings, PPCN is optimized (in step s11 of FIG. 9). This is resulted in the problem of the optimization of the combination of region candidates.

The ellipse and the parallel lines are taken as the shape features of the human body. However, considering that there are also the curve of the shoulder line, lines which cannot be detected as parallel lines and the like, it is estimated that calculation amount increases according to an increase in the number of candidates. Therefore, with a view of applying an effective algorithm, the PPCN optimization is formulated as an energy minimization problem.

If taking the logarithm of the both sides of formula (9), the following quadratic form can be obtained as an energy function.

$$E = -\sum_{b=1}^{n} \sum_{b'>b}^{n} \sum_{c=1}^{N_b} \sum_{c'>c}^{N'_b} w_{cc'}^{bb'} \cdot \eta_b^c \cdot \eta_{b'}^{c'} - \quad (10)$$

$$C_1 \sum_{b=1}^{n} \sum_{c=1}^{N_b} \mu_c^b \eta_b^c + C_2 \sum_{b=1}^{n} \left( \sum_{c=1}^{N_b+1} \eta_b^c - 1 \right)^2$$

In formula (10), $w_{cc'}^{bb'} = \log L_{cbc'b'}$, and $\mu_c^b = \log P_{cb}$ and $\eta_c^b$ takes 0 or 1.

The third term of formula (10) results from the following restriction condition.

$$\sum_{c=1}^{N_b+1} \eta_b^c = 1 \text{ for } \forall b \quad (11)$$

Restriction formula (11) is a necessary restriction condition if no region candidate exists because of occlusion or the like or if all the region candidates are erroneously detected.

To minimize E, simulated annealing, a genetic algorithm or the like may be used.

Figure 19:
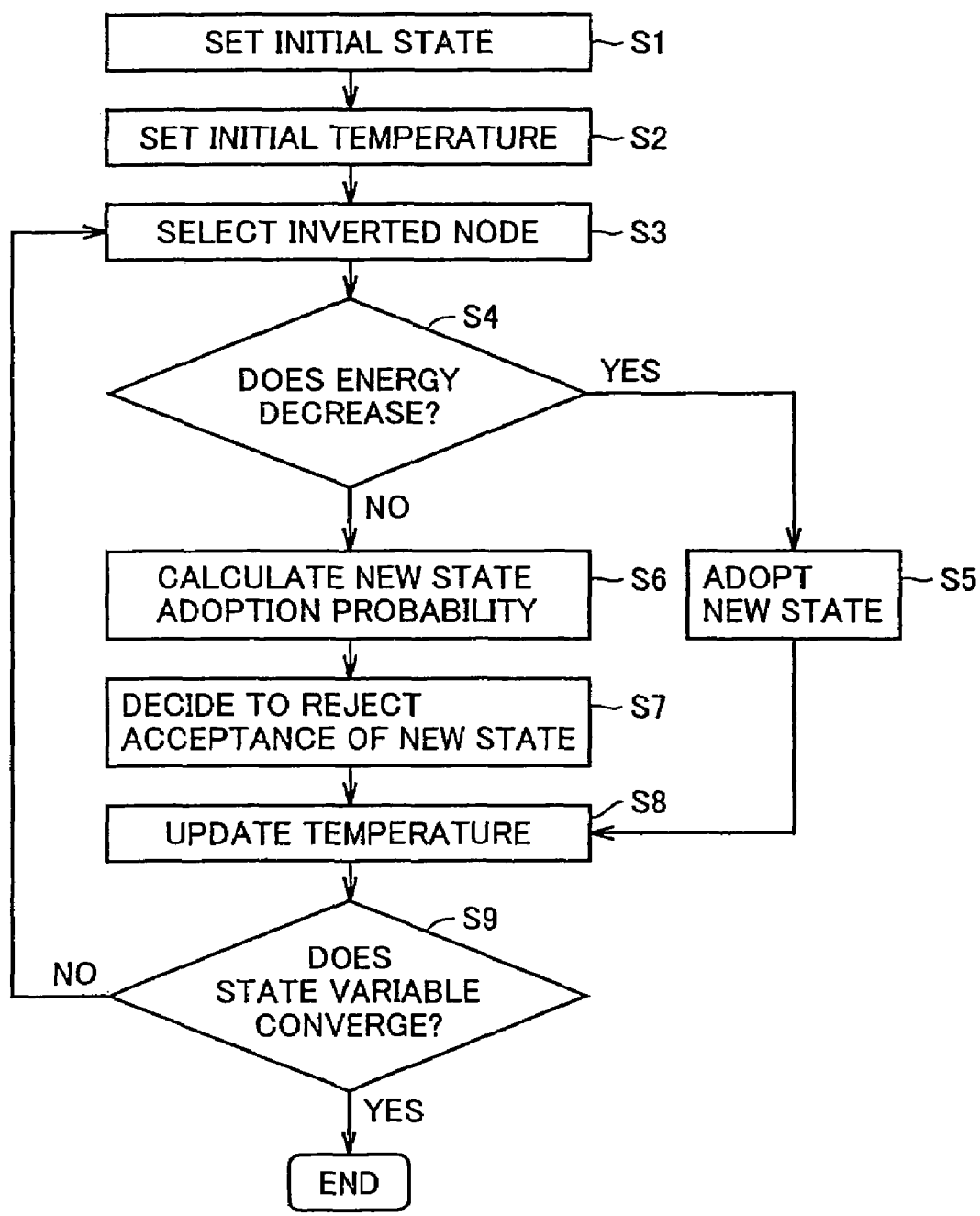
FIG. 19 is a flow chart showing an energy minimization processing using simulated annealing.

A processing flow when the simulated annealing, for example, is used will be described with reference to the sequence flow of FIG. 19.

It is assumed herein that a network state variable is represented by $\Omega_{i,j}$. Variable $\Omega_{i,j}$ is a binary variable hat takes values of $\{0, 1\}$, and i,j represents the two-dimensional position of the network. Value i changes between 1 and 'the number of regions +1' and j changes between 1 and 'the number of candidates +1'.

As an initial state, variable $\Omega_{i,j}$ is randomly allocated 0 or 1 for every i, j (in step s1).

The temperature of the network is set at an initial temperature $T_0$ (in step s2). One inverted node is randomly selected from $(N_b+n)$ network nodes (in step s3).

A new state is set at $\Lambda_{ij}$. If the selected node is 0, $\Lambda_{ij}$ is a state of becoming 1. If the selected node is 1, $\Lambda_{ij}$ is a state of becoming 0.

The difference $E(\Omega_{ij}) - E(\Lambda_{ij})$ between the energy function values in two states is calculated and it is determined whether the difference decreases (in step s4).

If the difference is determined to decrease, new state $\Lambda_{ij}$ is adopted as the network state and the processing moves to step s8 (in step s5).

If the difference between the energy function values increases, an adoption probability is calculated by the following formula in order to determine whether to adopt the new state (in step s6).

$$p = e^{-\frac{E(\Omega_{ij}) - E(\Lambda_{ij})}{T}} \qquad (12)$$

With probability p, the new state is adopted (in step s7). A new temperature is then calculated relative to the present temperature (in step s8). To be specific, the present temperature is multiplied by a constant $\alpha$ ($0 < \alpha < 1$) and resultant $T^*\alpha$ is set as a new temperature.

If the state variable has no change even after calculation is made a predetermined number of times, it is considered that the state variable converges and the optimization is finished.

After calculating an optimum solution, the term corresponding to the optimum solution is added to the energy function and a high weight factor is thus added to the energy function so as not to take the route for obtaining the optimum solution.

After detecting the optimum solution, energy is set so as to eliminate the solution and the next optimum solution is searched.

Not only the person probability (the sum of the first and second terms of the energy function) for one solution but also the positions and attitudes of the respective regions can be obtained, thus making it possible to analyze a factor for the number of persons and operation (in step s12 of FIG. 9).

To minimize the energy function expressed by formula (10), bold state transition may be made while regarding the nodes having high probability of region combination or, conversely, those having low probability as clusters of a group. If the genetic algorithm is used, a structure in which candidate numbers are aligned in the order of regions as generic coding can be used.

Second Embodiment

Figure 20:
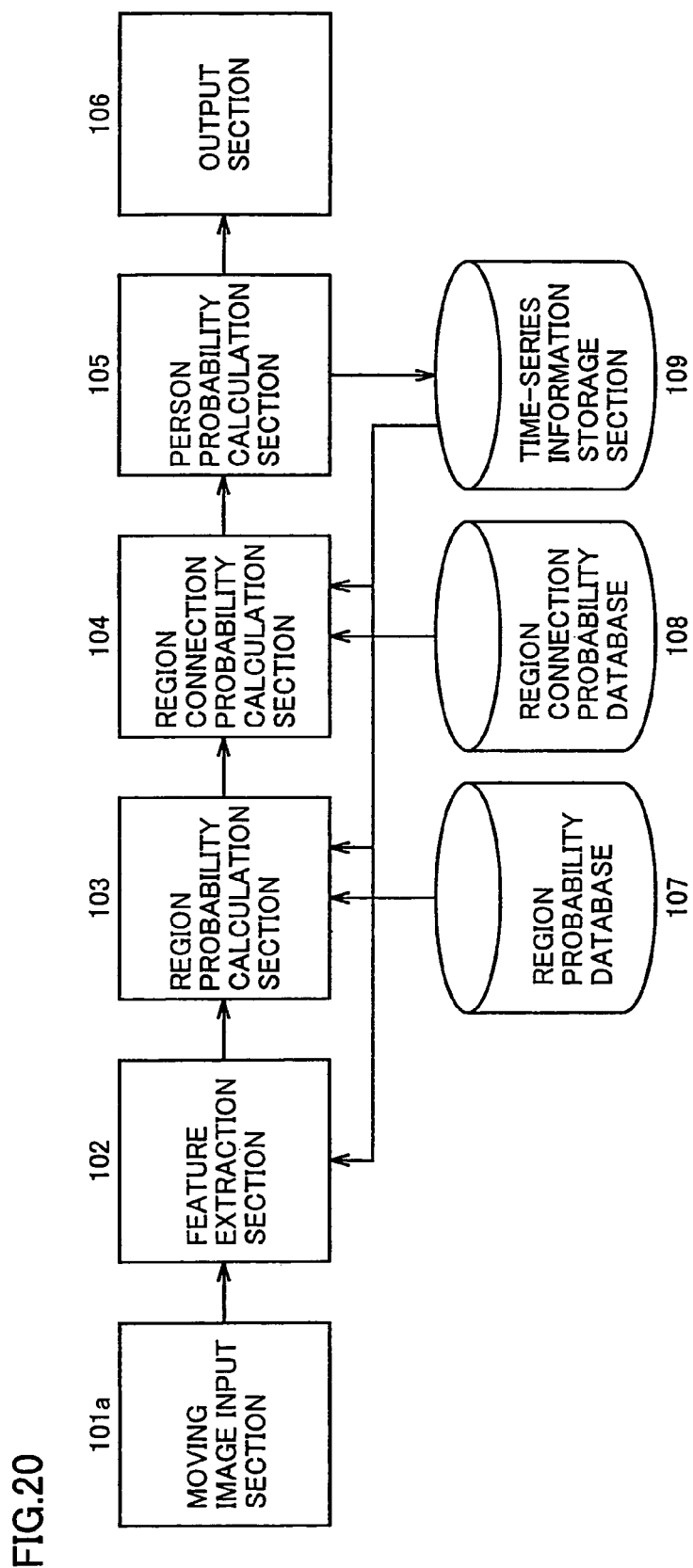
FIG. 20 is a block diagram showing the configuration of the detection apparatus in the second embodiment.

FIG. 20 is a block diagram showing the configuration of the detection apparatus in the second embodiment according to the present invention.

Since reference symbols 102 to 108 shown in FIG. 20 denote the same constituent elements as those in the first embodiment, they will not be repeatedly described herein.

The detection apparatus includes a moving image input section 101a which inputs a moving image. Moving image input section 101a may directly input a moving image from a digital video camera or may input a moving image stored in a storage medium.

The detection apparatus also includes a time-series information storage section 109 which stores parameter time-series information obtained as a result of following up region candidates which have high human likelihoods.

The overall processing flow of the detection apparatus will next be described with reference to the sequential flow of FIG. 21.

For the brevity of description, it is assumed herein that the head has a feature of an elliptic form and that the other region has a feature of parallel segments similarly to the first embodiment.

A moving image from which a person is to be detected is input from moving image input section 101a (in step s1). A motion region is extracted by the difference between frames and a candidate region is restricted (in step s2).

Since the processings from steps s3 to s8 are equal to those in the first embodiment, they will not be described herein repeatedly.

Next, a region probability connection distribution (to be referred to as "PPCD" hereinafter) is generated (in step s9).

The generation of PPCD will be described with reference to FIG. 22.

Similarly to the first embodiment, it is assumed that elliptic parameters of a head candidate are set as $D_1 = (X_1, Y_1, r_1)$ and $D_2 = (X_2, Y_2, r_2)$ and that parallel line parameters are set at $l_1 = (x_1, y_1, d_1, \theta_1)$ and $l_2 = (x_2, y_2, d_2, \theta_2)$.

It is also assumed that the head likelihoods of respective ellipse candidates are $p_h(D_1)$, $p_h(D_2)$, ..., the upper arm likelihoods of respective parallel line candidates are $p_{ua}(l_1)$, $p_{ua}(l_2)$, ..., and that the lower arm likelihoods of the respective parallel line candidates are $p_{da}(l_1)$, $p_{da}(l_2)$, .... Since the likelihoods of the other regions of the parallel line candidates are similar to those described above, only the upper and lower arm likelihoods will be described.

Using the region likelihood of each region and each region candidate, a region likelihood distribution is generated as follows (in step s1 shown in FIG. 22). As for the head, the head likelihoods of the elliptic region candidates are made to have a distribution. The following calculation is made for each head candidate.

$$pd_h^1(p^h) = p_h(D_1) \cdot g_{D_1, \Sigma}(p^h) \qquad (13)$$

In formula (13), $g_{D_1, \Sigma}(p^h)$ is an n variable Gauss function (head n=3) of an average $D_1$ and a covariance matrix $\Sigma$. Namely, $$g_{D_1, \Sigma}(p^h) = \frac{1}{(2\pi)^{n/2} |\Sigma|^{1/2}} e^{-\frac{1}{2}(p^h - D_1)^t \Sigma^{-1}(p^h - D_1)} \qquad (14)$$

In addition, $p^h = (X, Y, r)$
Likewise, $$pd_h^2(p^h) = p_h(D_2) \cdot g_{D_2, \Sigma}(p^h) \qquad (15)$$

As for the upper arm, the upper arm likelihoods of the parallel line region candidates are made to have a distribution. The following calculation is made for each upper arm candidate.

$$pd_{ua}^1(p^{ua}) = p_{ua}(l_1) \cdot g_{l_1, \Sigma}(p^{ua})$$

where $p^{ud} = (x, y, l, \theta)$
Likewise, $$pd_{ua}^2(p^{ua}) = p_{ua}(l_2) \cdot g_{l_2, \Sigma}(p^{ua})$$

As for the lower arm, the lower arm likelihoods of the parallel line region candidates are made to have a distribution. The following calculation is made for each lower arm candidate.

$$pd_{da}^1(p^{da}) = p_{da}(l_1) \cdot g_{l_1, \Sigma}(p^{da})$$

$p^{da} = (x, y, l, \theta)$
Likewise, $$pd_{da}^2(p^{da}) = p_{da}(l_2) \cdot g_{l_2, \Sigma}(p^{da})$$

Figure 22:
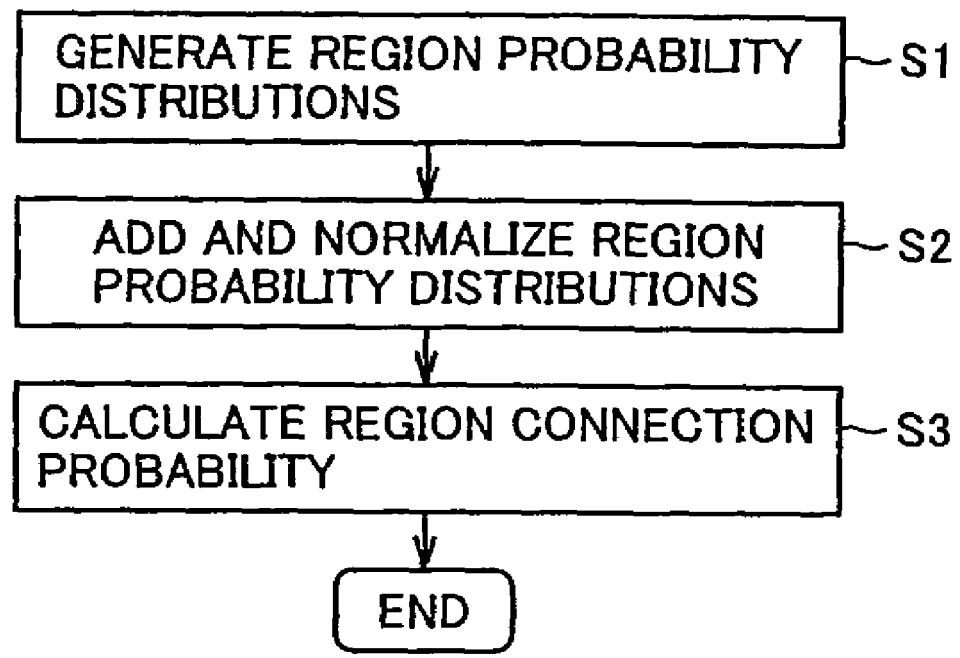
FIG. 22 describes the generation of PPCD.

Next, the likelihood distributions are added together and normalized for each region (in step s2 of FIG. 22).

For the head, the likelihood distribution is expressed as follows.

$$pd_h(p^h) = (pd_h^1(p^h) + pd_h^2(p^h) + \ldots)/N_h$$

(where $N_h$ is maximum likelihood).

For the upper arm, the likelihood distribution is expressed as follows.

$$pd_{ua}(p^{ua}) = (pd_{ua}^1(p^h) + pd_{ua}^2(p^{ua}) + \ldots)/N_{ua}$$

For the lower arm, the likelihood distribution is expressed as follows.

$$pd_{da}(p^{da}) = (pd_{da}^1(p^h) + pd_{da}^2(p^{da}) + \ldots)/N_{da}$$

Parameter spaces are connected in relation to each region and a total likelihood distribution is generated using a connection likelihood function for a connection parameter space (in step s3 of FIG. 22). This total likelihood distribution becomes PPCD.

To be specific, the parameter vectors of the respective regions are aligned and set as a connection parameter space. In other words, the connection parameter space is expressed as follows.

$$p^{total} = \begin{pmatrix} p^{h^T} \\ p^{ua^T} \\ p^{da^T} \\ \vdots \end{pmatrix}$$

A total likelihood distribution on this connection parameter space is defined by the following formula.

$$Ld^{total}\begin{pmatrix} p^{h^T} \\ p^{ua^T} \\ p^{da^T} \\ \vdots \end{pmatrix} = pd_h(p^h) \cdot pd_{ua}(p^{ua}) \cdot$$

$$pd_{da}(p^{da}) \cdot L_{hua}(p^h, p^{ua}) \cdot L_{uada}(p^{ua}, p^{da}) \cdot L_{dah}(p^{da}, p^h)$$

In the formula, $L_{hua}(p^h, p^{ua})$, $L_{uada}(p^{ua}, p^{da})$, $L_{dah}(p^{da}, p^h)$ are the region relationship connected likelihood functions defined in the first embodiment and represent the likelihood functions of the head and upper arm, the upper arm and lower arm and the lower arm and head, respectively.

Figure 21:
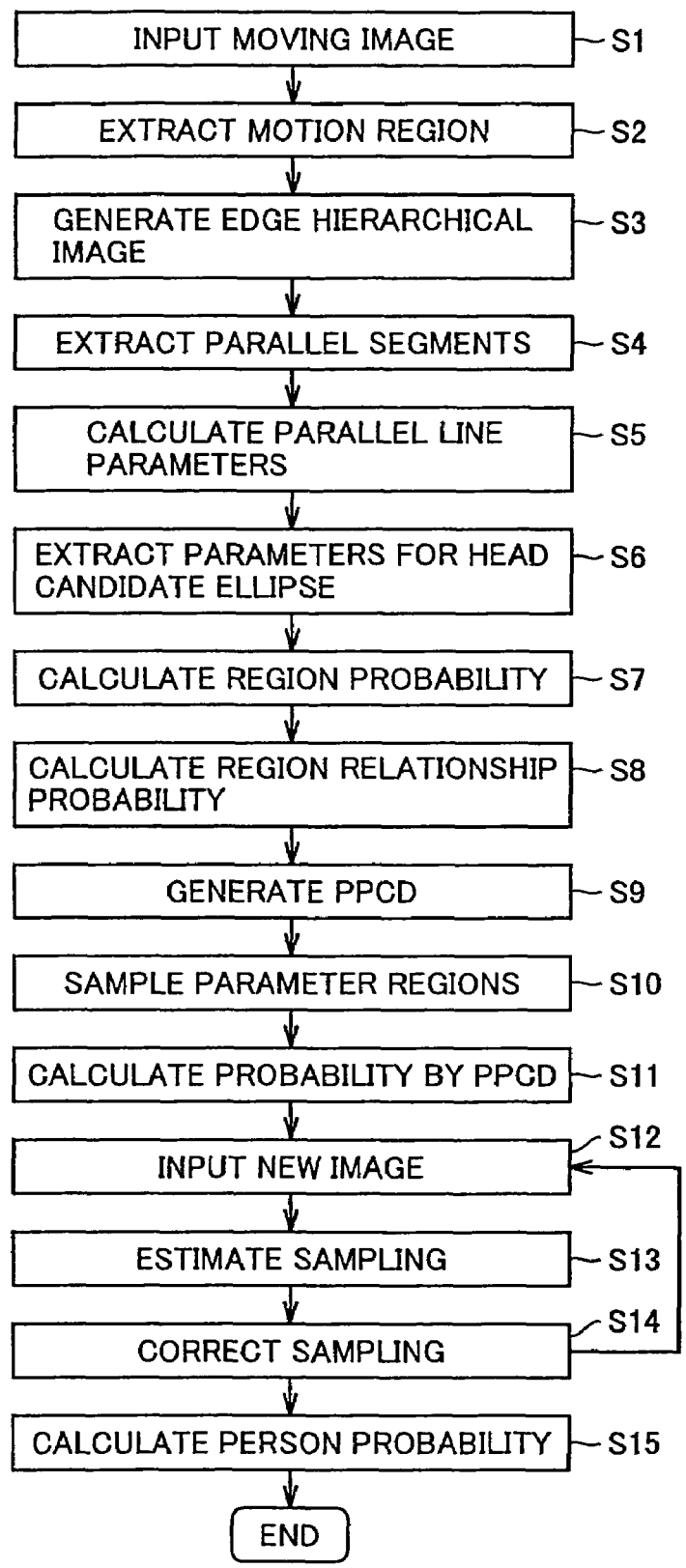
FIG. 21 is a flow chart showing the overall processing flow of the detection apparatus shown in FIG. 20.

Referring back to the flow chart of FIG. 21, random sampling is carried out in the connected parameter space (in step s10).

At this time, the random sampling is carried out within restrictions set in consideration of the motion region, and integrated likelihoods of respective sampling points are calculated using PPCD (e.g., a total sampling number is 1000) (in step s11).

An appropriate threshold is determined and sampling points equal to or higher than the threshold are left. The sampling points thus left are assumed as $s_0, s_1, \ldots$ and $s_N$, respectively. In addition, corresponding integrated likelihoods are assumed as $\pi_0, \pi_1, \ldots,$ and $\pi_N$, respectively.

Further, a cumulative probability distribution $\{c_n\}$ is calculated according to the following formulas in order to use $\{c_n\}$ in the following iteration.

$$c_0 = \pi_0$$

$$c_1 = \pi_0 + \pi_1$$

$$c_N = \pi_0 + \pi_1 + \ldots + \pi_N$$

These formulas are normalized so as to have a maximum of 1.

Further, the image of the next frame is read (in step s12). Using the posteriori probability of the previous frame and the state transition probability of a time-series equation of motion as prior information, sampling estimation is carried out (in step s13).

Based on the result of the sampling estimation and the new observed image, the sampling likelihoods are corrected (in step s14). Estimation and likelihood correction are repeated for new images. The processings of steps s13 and s14 will be described later.

When information is necessary, a person probability is calculated (in step s15).

Based on present sampling points $s_0, s_1, \ldots,$ and $s_N$ and corresponding likelihoods $\pi_0, \pi_1, \ldots,$ and $\pi_N$, the sampling points in descending order of likelihood are used as initial values, making it possible to calculate an extreme by an optimization method such as a steepest-descent method.

Figure 23:
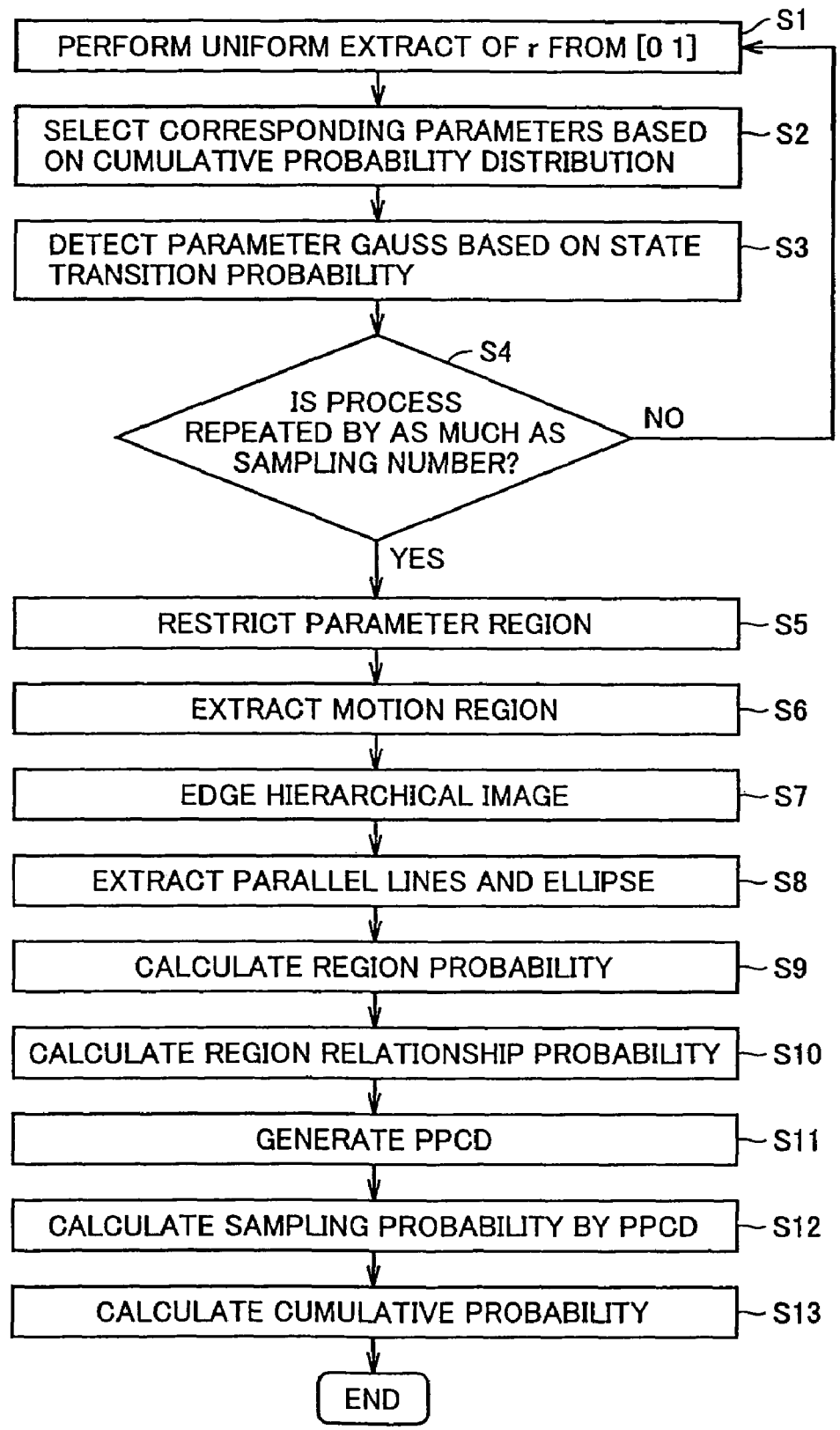
FIG. 23 shows the processings of steps s13 and s14 shown in FIG. 21.

Steps s13 and s14 will be described with reference to the flow chart of FIG. 23.

Uniform extraction of r from interval [0 1] is carried out (in step s1). Corresponding parameters are selected based on the previously obtained cumulative probability distribution (in step s2). To be specific, a minimum integral value m which satisfies $r<c_m$ is obtained (by binary search or the like) and corresponding parameter $s_m$ is obtained.

Using state transition probability $p(s^{t+1}|s^t=S_m)$, a new connected parameter $s^{t+1}=s_1'$ is obtained by Gauss sampling (in step s3).

It is noted that $p(s^{t+1}|s^t)$ can be calculated by assuming a time-series equation of motion. For example, it is assumed as follows.

$$x_{t+1} = Ax_t + Bw_t$$

(where it is assumed that $x_t$ is a state variable at time t, A is a motion model matrix, w is a standard Gauss distribution normalized according to B, and $BB^T$ is a noise covariance matrix.)

If so, $p(s^{t+1}|s^t)$ is expressed as follows.

$$p(x_{t+1} | x_t) = e^{-\frac{1}{2}\|B^{-1}(x_{t+1} - Ax_t)\|^2}$$

If one state variable $x_t$ is fixed, $p(s^{t+1}|s^t)$ becomes a Gauss distribution in relation to $x_{t+1}$.

A and B are estimated from sampling point time-series data stored in time-series information storage section 107 using a maximum likelihood method or the like. Speed information on each region is thus modeled.

This process is repeated by sampling number N (in step s4).

New N sampling points $s_1', s_2', \ldots,$ and $s_N'$ are obtained and stored in time-series information storage section 107.

Next, using the new sampling points, a parameter region is restricted (in step s5).

This restriction means restricting candidate regions and features of respective regions for the image of the next frame. Namely, the positions, sizes and directions of the respective regions are estimated and the estimation is used in the following steps.

Using the difference between the frames, a motion region is extracted (in step s6). An edge image within the motion region is generated (in step s7).

At this time, edges are extracted only from the related region using the information obtained in step s5, the binary threshold is adjusted to facilitate obtaining estimated parallel lines, a directionality filter is selected from an estimated direction range, and only human body related features are extracted.

The processings of steps s6 and s7 are performed by preprocessing section 201 of feature extraction section 102.

Since the processings of steps s8 to s11 are equal to those of steps s4 to s9 of FIG. 21, they will not be repeatedly described herein.

Using PPCD calculated from information on the restricted parameter regions, the integrated likelihoods of the estimated sampling points are evaluated (in step s12).

This valuation means calculating posteriori probabilities for estimated sampling points $s_1'$, $s_2'$, ..., and $s_N'$. These integrated likelihoods are set as $\pi_0'$, $\pi_1'$, ..., $\pi_N'$, respectively and the cumulative probability distribution is calculated (in step s13).

Third Embodiment

Figure 24:
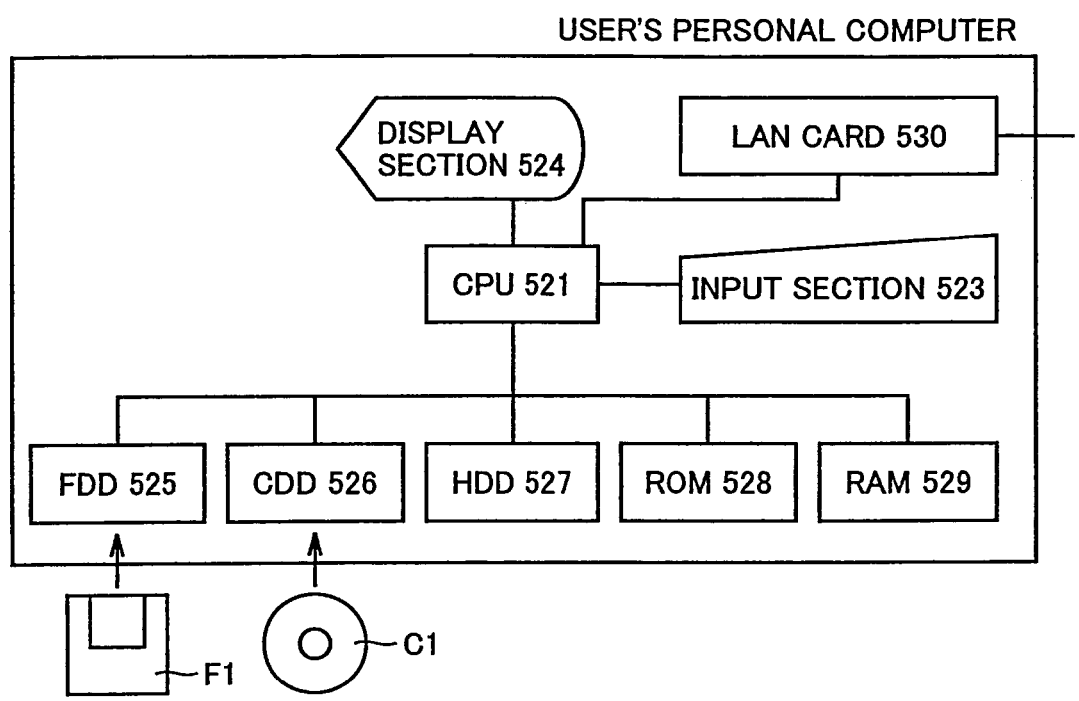
FIG. 24 is a block diagram showing the configuration of a computer which executes a program in the third embodiment according to the present invention.

FIG. 24 is a block diagram showing the configuration of a computer which executes a program in the third embodiment according to the present invention.

Referring to FIG. 24, the computer includes a CPU 521 which controls the overall computer, a display section 524, a LAN (local area network) card 530 (or a modem card) for connecting the computer to a network or holding communication with the outside, an input section 523 which is formed of a keyboard, a mouse and the like, a flexible disk drive 525, a CD-ROM drive 526, a hard disk drive 527, a ROM 528, and a RAM 529.

The program for driving CPU (computer) 521 as shown in the above-described flow charts can be recorded on a recording medium such as a flexible disk (F1) or a CD-ROM (C1). This program is transferred from the recording medium to the other recording medium such as RAM and recorded thereon. The program may be provided to a user by recording such a recording medium as a hard disk, a ROM, a RAM or a memory card. Alternatively, the program may be executed by downloading the program from an external site or the like through the Internet to a workstation or a computer.

Fourth Embodiment

The detection apparatus and the detection method in the fourth embodiment based on the detection apparatus and detection method in each of the first to third embodiments are characterized in that at least one of image edge information, image color information and image texture information is measured as a parameter for each region candidate and that a region probability of the region is calculated using the parameter.

Namely, if a region candidate is to be determined, at least one of color information, texture information and edge information as well as (or in place of) at least one of the size, position, attitude, length, width, radius of curvature, kurtosis, frequency characteristics of the candidate is used.

Likewise, if calculating a kurtosis for an arbitrary combination of region candidates, at least one of color information, texture information and edge information as well as (or in place of) at least one of the size, position, attitude, length, width, radius of curvature, kurtosis, frequency characteristics of the candidate is used.

Since the important parts of the detection apparatus and the detection method in this embodiment are equal to those in the first to third embodiments already described above, they will not be repeatedly described herein. The different parts of the detection apparatus and the detection method in this embodiment from those in the first to third embodiments will be described.

First, a concrete example of the processing performed by region probability calculation section 103 (see FIGS. 1 and 20) in this embodiment will be described. The processing will be described while taking the head candidate ellipse parameter extraction processing (step s5 of FIG. 9 or step s6 of FIG. 21) and the ellipse head probability calculation processing (step s6 of FIG. 9 or step s7 of FIG. 21) performed by region probability calculation section 103 as an example.

Similarly to the first to third embodiments, an elliptic shape is extracted from the edge image using Hough transform or the like so as to obtain a region having a high head probability and the extracted elliptic shape is set as a head candidate. If the size of the ellipse detected in each hierarchy is fixed, region probability calculation section 103 can obtain the likelihoods of the respective head feature candidates.

Using a likelihood p(d) related to the size of the head feature candidate and a likelihood p(c) related to color information in the ellipse, the head likelihood is obtained.

The size of the ellipse may be obtained by referring to the extracted parameters for the ellipse. The likelihood related to the size of each ellipse is calculated from the likelihood function stored in region probability database 107. The likelihood function can be statistically obtained from a plurality of person images. For example, the size of the region is calculated from a plurality of person images normalized by a height, a head size or the like and a histogram related to the size may be normalized or the like. In other words, if a parameter is d, an average is $m_d$ and a standard deviation is $\sigma_d$, the likelihood function can be approximated to the above-mentioned formula (1). It is thereby possible to obtain likelihood p(d) that the ellipse is the head of the person based on the size of the ellipse.

Since the position and size of the ellipse are known, it is possible to an ellipse region in the image. Using color information in the region and the neighborhood thereof, the head likelihood can be obtained.

For example, as described below, the likelihood that the ellipse is the head can be calculated using a black region and a skin color region in the ellipse. That is, the ratio of the hear color region (mainly defined as the black region) and the skin color region to the ellipse:

[Number of (hair+skin) color pixels]/(total number of pixels)

is calculated and the value is set as a parameter $R_c$. If the value is high, it means that the probability that the ellipse is the head is high. To calculate the likelihood, the following function is assumed.

$$p(c)=p(R)$$

As a color space, RGB space can be used. Alternatively, a space such as YIQ space suited for the extraction of the skin color may be used or the other color space may be used.

As described above, the probability $P_{head}$ that the ellipse is the head can be expressed based on the size of the ellipse and the color information on the interior of the ellipse as, for example, follows.

$$P_{head}=p(d)\cdot p(c)$$

It is thus possible to obtain the head likelihood while considering the color information. Further, to obtain the head likelihood using the texture information on the interior of the ellipse, the following processing may be carried out. The head likelihood of the ellipse feature candidate is obtained using likelihood p(d) related to the size of the ellipse and a likelihood p(T) related to the texture information on the interior of the ellipse.

The likelihood related to the size of the ellipse can be obtained using function p(d) as described above.

As for the texture information on the interior of the ellipse, the following example will be shown. Since the position and size of the ellipse are known, the ellipse region in the image is known. The head likelihood is obtained using the texture information on the interior of the region as well as on the neighborhood thereof. To analyze texture, various well-known methods are available. For example, a method by generating a density cooccurrence matrix, obtaining energy, entropy, correlation, local uniformity, inertia and the like are obtained based on the density cooccurrence matrix and comparing them, a method by frequency-transforming the image and comparing the power spectrum and frequency components of the frequency-transformed image, a method by locally performing matching and the like can be used.

To obtain the singe region probability of the head candidate region, parameter $T_M$ for the average texture of the head is obtained from a plurality of person images, obtained parameter $T_M$ is compared with a parameter $T_N$ for the head candidate region, and head likelihood p(T) is obtained according to the comparison result.

That is, the following function is assumed.

$$p(T)=f(T_N, T_M)$$

In this way, using the size and texture information, probability $P_{head}$ that the ellipse is the head is expressed as:

$$P_{head}=p(d) \cdot p(T)$$

Next, a concrete example of the processing performed by region connection probability calculation section 104 (see FIGS. 1 and 20) will be described. The processing will be described while taking the processing for calculating the parallel line-to-parallel line region relationship probability (step S9 of FIG. 9 or step S8 of FIG. 21) as an example. In addition, it is assumed herein that a combination of two regions the relationship between which is searched is that of the upper arm and the lower arm.

To obtain the correlation of parallel lines 1 and 2, it is assumed that feature amounts extracted from parallel line 1 are $l_1=(x_1(l_1), y_1(l_1), d_1(l_1), \theta_1(l_1), C_1(l_l))$ and those extracted from parallel line 2 are $l_2=(x_2(l_2), y_2(l_2), d_2(l_2), \theta_2(l_2), C_2(l_2))$. Symbols x(l), y(l), d(l), θ(l) and C(l) represent the x coordinate, y coordinate, thickness, direction (angle between the parallel line and the x axis (horizontal direction) of the image) of the parallel line, and color information on the region in the parallel line or the region in the parallel line and the neighborhood thereof, respectively.

These can be obtained from four end points that are parameters for the parallel line. The method for extracting the position (x coordinate and y coordinate), the thickness and direction of the parallel line is already described above. Therefore, a method for extracting the color information will be described herein.

Referring to FIG. 17, it is determined whether a color in a tetragon $P_{1a}$, $P_{1b}$, $P_{2b}$, $P_{2a}$ obtained by connecting the end points of edges 1 and 2 can be represented by one color. This determination is based on the degree of the single color. If it is determined that the color in the tetragon can be represented by one color, information on the typical color (an average value, the color that appears most frequently, an intermediate value and the like) is recorded. If it is determined not, information that the color is not a single color is recorded.

To determine the single color degree of the interior of the region, a method for determining the degree from the distribution values of pixel colors in the region or a method for determining that the color is a single color if the gradation of the interior of the region is lowered and the number of pixels belonging to a certain gradient is very large can be used. At this time, RGB space, for example, is used as the color space. Alternatively, the other color space may be used.

A likelihood based on the distance between the two regions is calculated by the following formula.

$$L_3=L_3(len)$$

(where len=$\{(x_1-x_2)^2+(y_1-y_2)^2\}^{1/2}$: the distance between the parallel lines)

The likelihood function can be calculated as a statistic histogram. In addition, the likelihood function can be approximated to the Gauss distribution or the like. A combination of $L_3$ and a likelihood function based on the width difference between the two regions may be used. The latter likelihood function can be expressed, for example, as follows.

$$L_4=L_4(d) \text{ (where } d=d_1-d_2)$$

If likelihood function $L_4$ is used, it is preferable not to use the absolute value of the width difference. If a distribution in which the probability of becoming negative is low is selected for $L_4$, it is possible to reflect the ordinary tendency that the upper arm is never thinner than the lower arm, on the likelihood function whether the target person wears a long-sleeved shirt or a half-length sleeved shirt. For example, a γ distribution can be used.

Furthermore, using the color information on the parallel line, a probability is given based on the color similarity of each region. If it is determined that the single color degree is high (a typical color can be obtained), the color similarity is reflected on the likelihood. The distance between the typical colors of the parallel lines in a certain space is measured and set as the color similarity. A region connection probability based on the color similarity is defined as follows.

$$L_5=L_5(col)$$

(where col=$|C_1-C_2|$: the distance between the typical colors of the respective parallel lines in the color space).

Thus, the parallel line-to-parallel line region relationship likelihood can be defined based on the distance between the parallel lines, the thickness difference therebetween and the color similarity, as follows.

$$L=L_3 \cdot L_4 \cdot L_5$$

The processing for determining the relationship between the regions using the texture information will next be described.

It is assumed that feature amounts extracted from parallel line 1 are $l_1=(x_1(l_1), y_1(l_1), d_1(l_1), \theta_1(l_1), T_1(l_1))$ and those extracted from parallel line 2 are $l_2=(x_2(l_2), y_2(l_2), d_2(l_2), \theta_2(l_2), T_2(l_2))$. Symbols x(l), y(l), d(l), θ(l) and T(l) represent the x coordinate, y coordinate, thickness, direction (angle between the parallel line and the x axis (horizontal direction) of the image) of the parallel line, and texture information on the region in the parallel line or the region in the parallel line and the neighborhood thereof, respectively. These can be obtained from four end points that are parameters for the parallel line.

To extract the texture information, texture in a tetragon $P_{1a}$, $P_{1b}$, $P_{2b}$, $P_{2a}$ obtained by connecting the end points of edges 1 and 2 shown in FIG. 17 is analyzed and the analysis result is stored. As described above, various well-known methods are available to analyze the texture.

The method for obtaining likelihood $L_3$ based on the distance between the two regions and likelihood $L_4$ based on the width difference between the two regions is already described above.

To obtain a probability based on the texture similarity of each region using the texture information on the parallel lines, a region connection probability based on the similarity is defined by the following formula.

$$L_5 = L_5(T_1, T_2)$$

Thus, the parallel line-to-parallel line region relationship likelihood can be defined based on the distance between the parallel lines, the thickness difference therebetween and the texture similarity, as follows:

$$L = L_3 \cdot L_4 \cdot L_5$$

While the example of obtaining the likelihood of the relationship between the parallel lines has been shown herein, the likelihood of the relationship between the ellipse and the parallel lines may be obtained based on the texture information, color information or the like.

As described above, in this embodiment, it is possible to consider the color information (hue, chroma, brightness and the like), the hair and the texture information such as the pattern, wrinkles and the like of clothes in calculating the region likelihoods and region relationship likelihoods. Alternatively, the likelihoods may be calculated from feature amounts obtained by analyzing the main components of the edge image for each region in place of the color information or the texture information.

As can be understood, in this embodiment, in the method for probabilistically calculating the human body likelihood by using the region likelihood of each human body region candidate and the correlation of the regions, the color and texture information are additionally considered as the feature amounts, thereby making it possible to improve calculation accuracy for region likelihood probabilities and human body likelihood probabilities.

Furthermore, the processing in this embodiment can be applied to the recognition of not only a human body but also an object the shape or the like changes.

The Effects of the Embodiment

According to the above-described embodiments, the human body likelihood is probabilistically calculated using the region probability of each human body region candidate easily extracted from the image and the correlation of the regions, whereby it is possible to detect the human body and estimate the attitude robustly against occlusion and change in photographic environment without increasing calculation cost.

In addition, the constitutions of the embodiments of the present invention can be applied to the automation of initial value estimation performed when applying a three-dimensional human body model to an image.

Furthermore, as long as the recognition of any object which is formed of a plurality of regions, for which the relationship between the regions are known and the shape of which complicatedly changes as a whole because of a high degree of freedom of the relationship, the present invention can be applied to any recognition target objects without limiting the target objects to the human body (e.g., animals, vegetables, deformable machines (such as a cleaner which includes a deformable part such as a hose or a grip and which has several types of the shapes of a suction port).

If a combination of region candidates is selected while considering not only the calculated probabilities of the respective regions but also the correlations among the region candidates, it is advantageously possible to improve detection accuracy. This is because correlations (e.g., the magnitude relationship) are considered. Further, if information related to the positional relationship between the two region candidates is used as the correlation and a detection target is, for example, a person, it is also possible detect the attitude of the person.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A detection method for detecting a detection target formed of a plurality of regions, from an image, the method comprising:
    an extraction step of extracting region candidates which become candidates of said plurality of regions from said image;
    a probability calculation step of calculating a probability that each of the extracted region candidates is at least one of said regions; and
    a selection step of selecting a combination of the region candidates having a high probability as being regions of said detection target based on positional relationships between the extracted region candidates and on the probability calculated in said probability calculation step,
    wherein said probability calculation step further comprises comparing said region candidates with probability density functions that are predetermined for each region of the detection target and stored in a database in order to express the degree each region candidate corresponds to the regions of the detection target.

2. The detection method according to claim 1, wherein each of said region candidates is extracted using at least one of edge information on the image, color information on the image and texture information on the image, and the probability that each of the region candidates is at least one of said plurality of regions is extracted using at least one of said edge information on the image, said color information on the image and said texture information on the image.

3. The detection method according to claim 1, wherein in said selection step at least two regions are combined to select the region candidates having a high probability.

4. A method for detecting a human body and estimating an attitude, comprising:
    a step of inputting an image;
    a region feature extraction step of extracting features and obtaining region candidates;
    a region probability calculation step of calculating a region probability of each of the region candidates; and
    a person probability calculation step of selecting a combination of regions based on the region probability and on positional relationships among the regions,
    wherein said probability calculation step further comprises comparing said region candidates with probability density functions that are predetermined for each region of the human body and stored in a database in order to express the degree each region candidate corresponds to the regions of the human body.

5. The method according to claim 4, wherein
    each of said region candidates is extracted using at least one of edge information on the image, color information on the image and texture information on the image, and the probability that each of the region candidates is at least one of said plurality of regions is calculated using at least one of said edge information on the image, said color information on the image and said texture information on the image.

6. The method according to claim 4, wherein
in said region feature extraction step, a multiple resolution strategy is utilized when extracting the region candidates.

7. A computer readable storage medium containing a computer executable detection program, said program comprising computer executable code to cause a computer to perform a method for detecting a detection target formed of a plurality of regions from an image, comprising the steps of:
an extraction step of extracting region candidates which become candidates of said plurality of regions from said image;
a probability calculation step of calculating a probability that each of the extracted region candidates is at least one of said regions; and
a selection step of selecting a combination of the region candidates having a high probability as being regions of said detection target based on positional relationships between the extracted region candidates and on the probability calculated in said probability calculation step,
wherein said probability calculation step further comprises comparing said region candidates with probability density functions that are predetermined for each region of the detection target and stored in a database in order to express the degree each region candidate corresponds to the regions of the detection target.

8. The computer readable storage medium according to claim 7, wherein the computer executable code is configured to cause a computer to perform the steps such that:
each of said region candidates is extracted using at least one of edge information on the image, color information on the image and texture information on the image, and
the probability that each of the region candidates is at least one of said plurality of regions is calculated using at least one of said edge information on the image, said color information on the image and said texture information on the image.

9. The computer readable storage medium according to claim 7, wherein the computer executable code is configured to cause a computer to perform the steps such that in said selection step at least two regions are combined to select the region candidates having a high probability.

10. A method for detecting in an image a detection target formed of a plurality of different separately identifiable regions, the method comprising:
extracting from an image one or more region candidates, each extracted region candidate corresponding to at least one of said plurality of different separately identifiable regions of a detection target;
calculating, for each extracted region candidate, a probability that such region candidate corresponds to one of said plurality of different separately identifiable regions, said calculating step including a plurality of calculation techniques, each of said calculation techniques corresponding to a different type of separately identifiable regions of the detection target; and
selecting, based on the probabilities calculated calculating step for the extracted region candidates and on positional relationships between the extracted region candidates and, a combination of the region candidates having a high probability as being said detection target,
wherein said calculating further comprises comparing said region candidates with probability density functions that are predetermined for each region of the detection target and stored in a database in order to express the degree each region candidate corresponds to the regions of the detection target.

11. A method for detecting in an image a detection target according to claim 10, further comprising the step of:
calculating, for at least two of said extracted region candidates, a connection probability for at least two of said extracted region candidates.

12. A method for detecting in an image a detection target according to claim 11, wherein said selecting step selects a combination of extracted region candidates based on both the probabilities calculated calculating step for the extracted region candidates and on a connection probability for at least two of said extracted region candidates.

13. A method for detecting in an image a detection target according to claim 10, wherein:
said extracting step extracts each of said region candidates based on at least one of edge information in the image, color information in the image and texture information in the image, and
said calculating step calculates a probability that each of the region candidates corresponds to one of said plurality of different separately identifiable regions based on at least one of said edge information in the image, said color information in the image and said texture information in the image.

14. A method for detecting in an image a detection target according to claim 10, wherein:
said extracting step extracts each of said region candidates based on a shape identified, including at least one of an ellipse, a line, a curve and parallel segments.

15. A method for detecting in an image a detection target according to claim 10, further comprising the step of calculating parameters for each of said region candidates, and
wherein said calculating step calculates a probability that each of the region candidates corresponds to one of said plurality of different separately identifiable regions based on said parameters for said region candidates.

16. An object recognition system for recognizing an object having a plurality of different separately identifiable regions, the system comprising:
a preprocessing section which is configured to detect image features from an input image;
a region detection section which is configured to detect region candidates based on the image features detected in the preprocessing section;
a region probability calculation section which is configured to calculate probabilities for the detected regions, said region probability calculation section begin configured to perform a plurality of calculation techniques, each of said calculation techniques corresponding to a different type of separately identifiable regions of the detection target;
a region connection probability calculation section which is configured to calculate a connection likelihood for at least one region to another region; and
an object probability section which is configured to determine, based on the probabilities for the detected regions and on positional relationships between said at least one region to another region, a combination of regions which are probable to correspond to a predetermined object,
wherein said region probability calculation section is further configured to compare said region candidates with probability density functions that are predetermined for each region of the object and stored in a database in order to express the degree each region candidate corresponds to the regions of the object.

17. An object recognition system according to claim 16, wherein:
  said region detection section detects region candidates based on at least one of edge information in the input image, color information in the input image and texture information in the input image, and
  said region probability calculation section calculates a probability for each of the detected regions that a region candidate corresponds to one of said plurality of different separately identifiable regions of the detection target based on at least one of said edge information in the image, said color information in the image and said texture information in the image.

18. An object recognition system according to claim 16, wherein:
  said region detection section detects region candidates based on shapes identified including at least one of an ellipse, a line, a curve and parallel segments.

19. An object recognition system according to claim 16, further comprising:
  a region candidate parameter calculation section which is configured to calculate parameters for each of detected regions, and
  wherein said region probability calculation section calculates probabilities for the detected regions based on said parameters for said detected regions.

* * * * *

UNITED STATES PATENT AND TRADEMARK OFFICE
CERTIFICATE OF CORRECTION

| | |
|---|---|
| PATENT NO. | : 7,483,548 B2 |
| APPLICATION NO. | : 10/452426 |
| DATED | : January 27, 2009 |
| INVENTOR(S) | : Nakano et al. |

It is certified that error appears in the above-identified patent and that said Letters Patent is hereby corrected as shown below:

Column 22:
Line 31, delete "database in order to" and insert -- database, in order to --.

Column 22:
Line 56, delete "wherein said probability" and insert -- wherein said region probability --.

Column 22:
Line 59, delete "database in order to" and insert -- database, in order to --.

Column 24:
Line 1, delete "database in order to" and insert -- database, in order to --.

Column 24:
Line 65, delete "database in order to" and insert -- database, in order to --.

Signed and Sealed this

Sixteenth Day of March, 2010

David J. Kappos
*Director of the United States Patent and Trademark Office*